United States Patent
Bromer

(10) Patent No.: US 9,851,574 B2
(45) Date of Patent: Dec. 26, 2017

(54) MIRROR ARRAY DISPLAY SYSTEM

(75) Inventor: Nicholas Sheppard Bromer, Marietta, PA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 646 days.

(21) Appl. No.: 14/232,797

(22) PCT Filed: Jan. 20, 2012

(86) PCT No.: PCT/US2012/021961
§ 371 (c)(1),
(2), (4) Date: Jan. 14, 2014

(87) PCT Pub. No.: WO2013/109282
PCT Pub. Date: Jul. 25, 2013

(65) Prior Publication Data
US 2014/0168210 A1     Jun. 19, 2014

(51) Int. Cl.
*G02B 27/22* (2006.01)
*G02B 26/08* (2006.01)
*G02B 27/00* (2006.01)

(52) U.S. Cl.
CPC ..... *G02B 27/2235* (2013.01); *G02B 26/0816* (2013.01); *G02B 27/0093* (2013.01); *G02B 27/2292* (2013.01)

(58) Field of Classification Search
CPC ............ G02B 27/2235; G02B 26/0816; G02B 27/0093; G02B 27/2292; H04N 13/0239
(Continued)

(56) References Cited

U.S. PATENT DOCUMENTS 5,602,978 A * 2/1997 Lastinger ................ G06T 15/10
345/419
9,256,974 B1 * 2/2016 Hines ..................... G06F 3/0346
(Continued)

FOREIGN PATENT DOCUMENTS

EP            2144448 A1     1/2010

OTHER PUBLICATIONS

"MEMS Laser Scanning Micromirrors and Microprojection Modules," Meric Technology—Lemoptix, accessed at http://www.merictech.com/lemoptix%20documents/Meric_Lemoptix_15Nov10.pdf, Nov. 2010, pp. 1-13.
"Introduction—What is a pico projector?", retrieved from http://www.picoprojector-info.com/introduction, 2004-2014, 3 pages.
(Continued)

*Primary Examiner* — Mishawn Hunter
(74) *Attorney, Agent, or Firm* — Moritt Hock & Hamroff LLP; Steven S. Rubin, Esq.

(57) ABSTRACT

Technologies are generally described herein for a mirror array display system. In some examples, a controller can be configured to execute various methods for displaying content using a mirror array display having a mirror array including a number of mirrors and a light source. The controller can obtain content for display. The controller can also determine at least one aiming parameter associated with the number of mirrors and the light source. The controller can also emit light using the light source and aim the light emitted by the light source to a convergence point to generate a three-dimensional representation of the content, wherein the light is aimed in accordance with the at least one aiming parameter.

28 Claims, 14 Drawing Sheets

(58) Field of Classification Search
USPC .............................................. 348/42, 47, 51
See application file for complete search history.

(56) References Cited

U.S. PATENT DOCUMENTS

| | | | |
|---|---|---|---|
| 2005/0094230 A1 | 5/2005 | Klug et al. | |
| 2005/0190180 A1* | 9/2005 | Jin | H04N 13/0018 345/419 |
| 2008/0261693 A1 | 10/2008 | Zalewski | |
| 2009/0161193 A1* | 6/2009 | Maeda | G02B 26/0833 359/263 |
| 2009/0303597 A1 | 12/2009 | Miyawaki et al. | |
| 2011/0032365 A1* | 2/2011 | Yett | G02B 27/2235 348/207.1 |
| 2011/0175797 A1 | 7/2011 | Tomisawa et al. | |
| 2012/0038892 A1* | 2/2012 | Kurtz | H04N 9/3105 353/31 |

OTHER PUBLICATIONS

"Picoprojectors: Nanosecond modulation makes cell-phone projectors possible," acessed at http://www.laserfocusworld.com/articles/print/volume-44/issue-5/features/picoprojectors-nanosecond-modulation-makes-cell-phone-projectors-possible.html, May 1, 2008, pp. 1-9.

Huebschman, M., et al., "Digital micromirrors enable holographic video display," laser Focus World, accessed at http://www.laserfocusworld.com/articles/print/volume-40/issue-5/features/3-d-displays/digital-micromirrors-enable-holographic-video-display.html, May 2004, pp. 1-5.

Min, S-W., et al., "Three-dimensional electro-floating display system using an integral imaging method," Optics Express, 2005, pp. 4358-4369, vol. 13, No. 12.

Wong, G., "Pioneer Floating Vision display lets you "touch" 3D visuals," accessed at http://www.ubergizmo.com/2011/05/pioneer-floating-vision-display/, May 26, 2011, pp. 1-3.

International Search Report with Written Opinion for International Application No. PCT/US2013/021961 dated May 20, 2013, 9 pages.

* cited by examiner

MIRROR ARRAY DISPLAY SYSTEM

CROSS-REFERENCE TO RELATED APPLICATION

This application is a U.S. National Stage filing under 35 U.S.C. §371 of International Application No. PCT/US12/21961, filed on Jan. 20, 2012, the entirety of which is hereby incorporated by reference.

BACKGROUND

Unless otherwise indicated herein, the materials described in this section are not prior art to the claims in this application and are not admitted to be prior art by inclusion in this section.

Users sometimes interact with two-dimensional ("2D") information presented by way of 2D display devices. With the proliferation of smaller and more compact display devices and an increase in the amount of available content for display on the display devices, users sometimes are limited in their interactions with displayed information. In particular, the display real estate can be limited, and interactions with the information displayed on the display devices can be limited to various interactions such as drag-and-drop mouse commands, swipe gestures on touch interfaces, and the like.

Additionally, many users are increasingly performing a greater percentage of computing tasks on mobile devices having small displays that are not necessarily well-suited to presenting large amounts of information. Thus, websites, for example, may provide mobile versions of websites that lack detail included on full versions of the sites to avoid crowding the limited display space of the mobile devices. As such, users may sacrifice detail in displayed content for display space and/or may sacrifice detail and/or display space due to a compressed size of a mobile device. Similarly, with an increased reliance upon small compact computing devices such as smart phones, the importance of power conservation has increased in conjunction with the increased reliance upon these devices. As such, users also often trade bright and/or large displays for energy efficiency.

Three dimensional ("3D") technologies are starting to become popular. One limitation of 3D technologies that continues to hamper growth is the requirement, in most solutions, of added gear such as glasses, special screens, or the like, to view 3D content. Users, therefore, may be unable to view 3D content if they do not currently have in their possession the required 3D gear or equipment.

SUMMARY

The present disclosure generally describes concepts and technologies for displaying content using a mirror array. According to various embodiments of the concepts and technologies disclosed herein, an array of aimed or steerable mirrors is controlled by a controller or other processing device to create real images in an interaction space or virtual images outside the interaction space. A laser beam emitted from a laser is used to project one or more points corresponding to surfaces of an object represented by a displayed image. Each of the points can correspond to light projected by the laser from one or more angles. As such, light rays or light beams can emanate from the mirror array and illuminate each point of the object, forming a real image. The real image can correspond to a three-dimensional object. The user can interact with the three-dimensional objects by using gestures tracked by cameras, voice commands, or other commands that are interpreted by the controller and/or otherwise detected by the controller. The controller can modify the image created by the mirror array display system in response to the commands or gestures.

According to one aspect, a computer-implemented method for displaying content using a mirror array display is provided. The mirror array display includes a controller, a mirror array having one or more mirrors, and a light source, and the method includes computer-implemented operations for obtaining, by the controller, the content, determining, by the controller, at least one aiming parameter associated with the one or more mirrors and the light source, emitting light, using the light source, and aiming the light emitted by the light source to a convergence point to generate a three-dimensional representation of the content. The light can be aimed in accordance with the at least one aiming parameter.

According to some embodiments, the convergence point includes a first convergence point and a second convergence point, and the content includes a first content component visible at the first convergence point and a second content component visible at the second convergence point. The method can also include determining, using a tracking system associated with the mirror array display, a first location, relative to the mirror array display, of a first viewer; determining, using the tracking system, a second location, relative to the mirror array display, of a second viewer; determining the first convergence point based, at least partially, upon the first location; and determining the second convergence point based, at least partially, upon the second location. According to various implementations, aiming the light includes aiming a first portion of the light emitted by the light source to the first convergence point and aiming a second portion of the light emitted by the light source to the second convergence point.

In some embodiments, determining the aiming parameter includes executing an aiming algorithm at the controller based, at least partially, upon the convergence point. Determining the aiming parameter can include determining, using the aiming algorithm, a modulation rate for the light source and a rotation angle, relative to the light source, of at least one of the one or more mirrors. In some embodiments, the light source includes a laser and determining the aiming parameter includes determining, using the aiming algorithm, a modulation rate of a laser beam emitted by the laser and a rotation angle, relative to the light source, of at least one of the one or more mirrors. The mirror array display further can include a secondary mirror for aiming the laser beam emitted by the laser, and determining the aiming parameter further can include determining the rotation angle, relative to the light source, of the secondary mirror.

In some embodiments, the method also includes determining, using a tracking system associated with the mirror array display, a location, relative to the mirror array display, of a viewer and determining the convergence point based, at least partially, upon the location of the viewer. The method can also include determining that the viewer has moved relative to the convergence point; in response to determining that the viewer has moved, determining at least one modified aiming parameter and a modified convergence point; and aiming the light emitted by the light source to the modified convergence point, wherein the light is aimed in accordance with the at least one modified aiming parameter.

The method can also include determining, using a tracking system associated with the mirror array display, a location, relative to the mirror array display, of a viewing area; determining the convergence point based, at least partially, upon the location of the viewing area; and determining that the viewing area has moved relative to the convergence point. In response to determining that the viewing area has moved, the method further can include determining a rotation angle, relative to a rotation axis associated with the mirror array display, of a movement of the viewing area, modifying the content in accordance with the rotation angle to obtain modified content, determining a modified convergence point, in accordance with the rotation angle, and aiming the light emitted by the light source to the modified convergence point. In some embodiments, the method further includes detecting, with a tracking system in communication with the controller, a movement of a user corresponding to an interaction with the three-dimensional representation. The method can also include modifying the content in response to the interaction.

According to another aspect, a computer readable medium for displaying content using a mirror array display is disclosed. The computer readable medium includes including computer executable instructions that, when executed by a computer, cause the computer to obtain content for display at a mirror array display including a mirror array having one or more mirrors and a light source; determine at least one aiming parameter for at least one of the one or more mirrors and a modulation rate of light emitted by the light source; and emit light, using the light source; and aim the light emitted by the light source to a convergence point to generate a three-dimensional representation of the content. According to some embodiments, the light is aimed by moving the at least one of the one or more mirrors in accordance with the at least one aiming parameter and emitting the light in accordance with the modulation rate.

According to some embodiments, the computer readable medium further includes instructions that, when executed by the computer, cause the computer to determine, using a tracking system associated with the mirror array display, a location, relative to the mirror array display, of a viewing area associated with a viewer; and determine the convergence point based, at least partially, upon the location of the viewing area. The computer readable medium further can include instructions that, when executed by the computer, cause the computer to determine that the viewer has moved relative to the convergence point; when a determination is made that the viewer has moved, determine at least one modified aiming parameter and a modified convergence point; and aim the light emitted by the light source to the modified convergence point. In some embodiments, the light is aimed in accordance with the at least one modified aiming parameter. The computer readable medium further can include instructions that, when executed by the computer, cause the computer to determine that the viewing area has moved relative to the convergence point; when a determination is made that the viewing area has moved, determine a rotation angle, relative to a rotation axis associated with the mirror array display, of a movement of the viewing area, modify the content in accordance with the rotation angle to obtain modified content, determine a modified convergence point, in accordance with the rotation angle, and aim the light emitted by the light source to the modified convergence point.

According to some embodiments, the computer readable medium further includes instructions that, when executed by the computer, cause the computer to determine a rotation point associated with the mirror array display; track movement, using the tracking system, of the viewing area relative to the rotation point; and calculate the rotation angle based, at least partially, the movement. In some embodiments, the tracking system includes an image capture device for tracking movement of the viewer. In some embodiments, the tracking system includes an orientation sensor of a device, and to determine the rotation angle, the computer executable instructions, when executed by the computer, further cause the computer to determine, using the orientation sensor a rotation point associated with the mirror array display, an amount the device is moved, relative to the rotation point, and the rotation angle based, at least partially, upon the movement. In some embodiments, the computer readable medium further includes computer executable instructions that, when executed by the computer, cause the computer to detect, via receiving tracking data generated by a tracking system in communication with the computer, a movement of a user corresponding to an interaction with the three-dimensional representation; and modify the content in response to the interaction.

According to another aspect, a mirror array display for generating a three-dimensional representation of content is disclosed. The mirror array display can include a mirror array having one or more mirrors, a light source configured to emit light for projection by the one or more mirrors, and a controller configured to execute computer executable instructions to determine at least one aiming parameter for at least one of the one or more mirrors, determine a modulation rate of light emitted by the light source, control the light source to emit light in accordance with the modulation rate, and control an orientation of at least one of the one or more mirrors to project the light toward a convergence point. In some embodiments, the controller controls the orientation of the at least one of the one or more mirrors in accordance with the at least one aiming parameter.

According to some embodiments, the mirror array display further includes a secondary mirror configured to direct light emitted by the light source toward at least one of the one or more mirrors. The controller can be further configured to control an orientation of the secondary mirror and the light source can include a laser. The controller can also be further configured to execute computer executable instructions to determine, using a tracking system associated with the mirror array display, a location, relative to the mirror array display, of a viewing area associated with a viewer, and determine the convergence point based, at least partially, upon the location of the viewing area. In some embodiments, the controller is further configured to execute computer executable instructions to determine that the viewer has moved relative to the convergence point, when a determination is made that the viewer has moved, determine at least one modified aiming parameter and a modified convergence point, and aim the light emitted by the light source to the modified convergence point, wherein the light is aimed in accordance with the at least one modified aiming parameter.

According to some embodiments, the controller is further configured to execute computer executable instructions to determine that the viewing area has moved relative to the convergence point, when a determination is made that the viewing area has moved, determine a rotation angle, relative to a rotation axis associated with the mirror array display, of a movement of the viewing area, modify the content in accordance with the rotation angle to obtain modified content, determine a modified convergence point, in accordance with the rotation angle, and aim the light emitted by the light source to the modified convergence point. In some embodiments, the mirror array has a first side and a second side, and the light source is located at the first side and the convergence point is located at the second side. In some embodiments, the mirror array has a first side and a second side, and the light source and the convergence point are located at the first side of the mirror array. In some embodiments, the controller is further configured to execute computer executable instructions to detect, via receiving tracking data generated by a tracking system in communication with the controller, a movement of a user corresponding to an interaction with the three-dimensional representation, and modify the content in response to the interaction.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
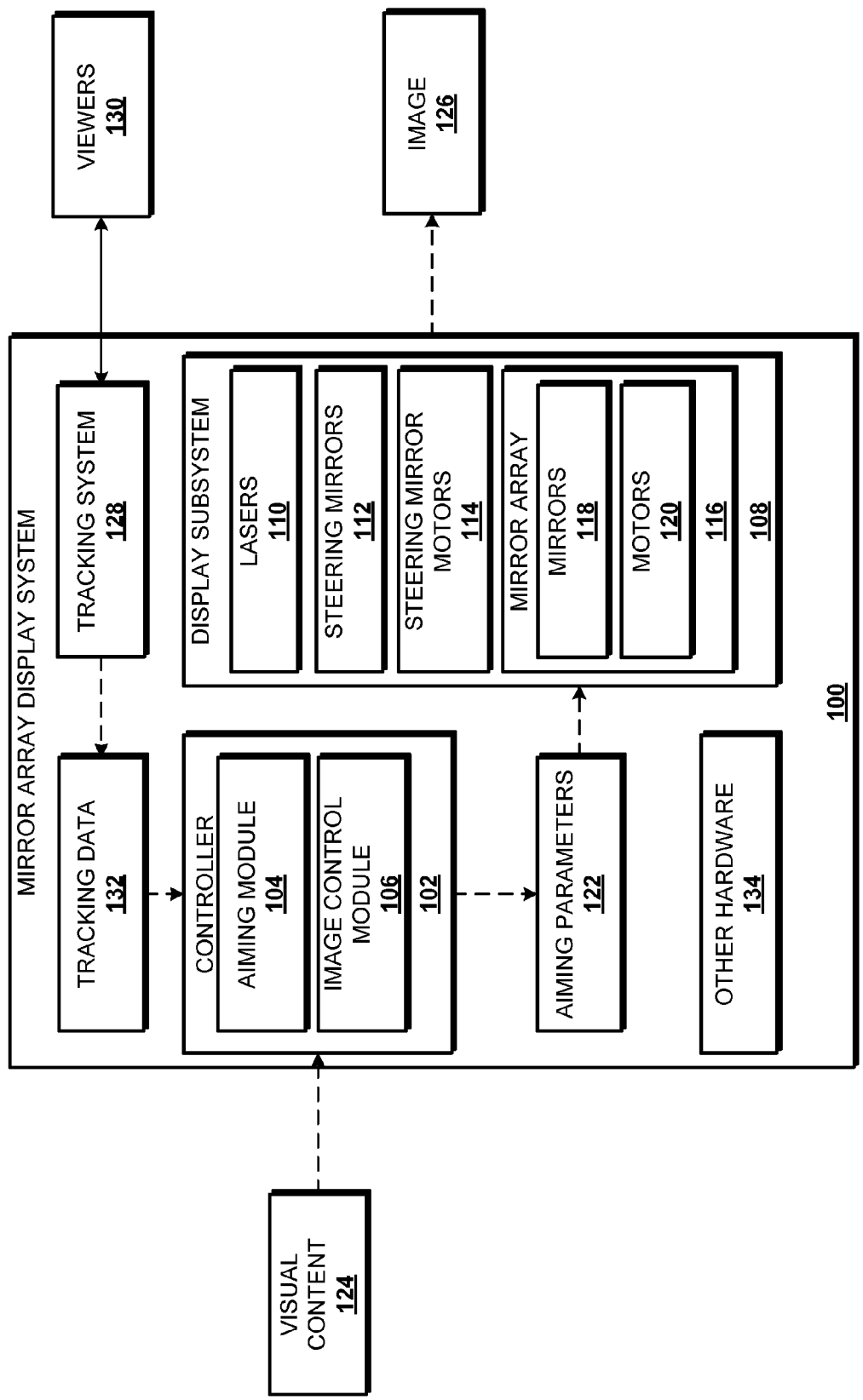
FIG. 1 is a block diagram illustrating a mirror array display system for displaying content using a mirror array.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the FIGURES, can be arranged, substituted, combined, separated, and designed in a wide variety of different configurations, all of which are explicitly contemplated herein.

This disclosure is generally drawn, inter alia, to technologies for displaying content using a mirror array. In an illustrative example, a mirror array display system can include a controller and a display subsystem that can include a mirror array having a number of mirrors. The display system can also include a laser and a steering mirror for aiming light emitted by the laser. The controller can be configured to control the mirrors and the laser to emit light toward a viewing area to generate a real image in free space. The mirror array display system can further include a tracking system for tracking movements of viewers and/or interactions of viewers with the displayed images in free space.

The controller can obtain visual content and determine a location at which to project an image corresponding to the visual content. The location can include a viewing area and/or a convergence point associated with a viewing area and/or viewer. The viewing area and the convergence point may or may not coincide with one another. The controller can determine aiming parameters for controlling a light source such as a laser, a steering mirror if used, or one or more mirrors in the mirror array. One or more of the mirrors can be controlled by a motor via the aiming parameters generated by the controller. As will be explained in more detail herein, the mirror array display system can be used to create real images in free space such as an interaction space. As is known, one type of image in optics is a real image. In a real image, there can be a one-to-one correspondence, for example, a complete mapping, from one or more points on a real world object to corresponding one or more points in the real image. In accordance with various embodiments of the concepts and technologies disclosed herein, a three-dimensional object, which in appearance is identical to a real-world object, can be created by converging rays or light beams emitted by the lasers.

In some implementations, the mirror array display system can support viewing by multiple viewers, where the viewers may see the same image albeit from different angles. In some other embodiments, the mirror array display system can display multiple copies of the same image, one for each viewer (for example, one copy of the image directly in front of each viewer). In other embodiments, each of the viewers may see a different image generated based upon various instances of visual content. The controller can calculate a convergence cone that ends at a convergence point in front of a face or eyes of the viewer, the convergence point corresponding to one point of a displayed real image that can be seen by a viewer.

The controller can also calculate a line that extends from the convergence point to a mirror on the mirror array that is to display light for the convergence point. The controller can calculate convergence points corresponding to one or more contours or surfaces of the displayed image and can display the image by projecting or emitting light corresponding to the convergence points toward the viewing area. Thus, the mirror array display system can display an image by emitting or projecting light toward a viewing area to a convergence point to generate the image. In some embodiments, the rays may diverge and enter the eyes of the viewer. As such, the viewer can see a real image that appears to the viewer to float in free space in between the mirror array and the viewer. Thus, viewers can see 3D images in free space and can interact with the images, in accordance with the various embodiments disclosed herein. These and other aspects of systems and methods for displaying content using a mirror array display will be described in more detail herein.

Figure 9:
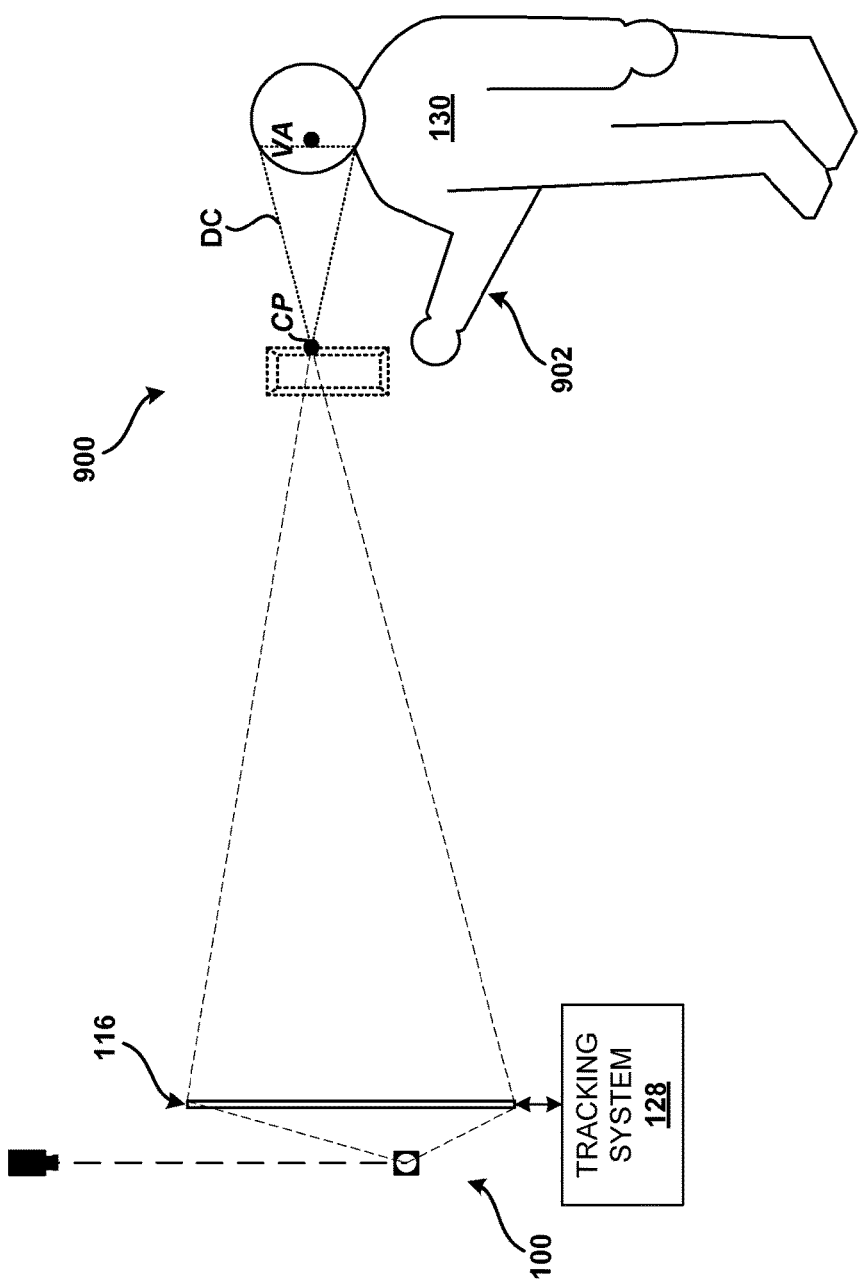
FIG. 9 is a line drawing illustrating additional aspects of the mirror array display system.

Referring now to FIG. 1, a block diagram illustrating a mirror array display system 100 for displaying content using a mirror array arranged according to at least some embodiments presented herein will be described. (The optical nature of the display is best illustrated in FIG. 9, discussed below.) As will be explained in more detail herein, the mirror array display system 100 can be embodied as part of a computer display, a monitor, a television set, a laptop or other mobile computing device, a mobile telephone or smartphone, a projector system, or the like. The mirror array display system 100 can also be embodied as a ubiquitous display that is integrated within a wall, table, counter, building, signage, furniture, and/or other surfaces of other structures. In some other embodiments, one or more components of the mirror array display system 100 can be embodied in a display device, while one or more other components of the mirror array display system 100 can be communicatively coupled to one another via a network connection or one or more other types of connections.

For purposes of explaining the various components of the mirror array display system 100, the mirror array display system 100 is described herein as being embodied in a display screen of a computer display, a wall of mirrors such as a stationary mirror array, or a mobile telephone display. It should be understood that these embodiments are illustrative, and should not be construed as being limiting in any way. Although not illustrated in FIG. 1, it should be understood that the mirror array display system 100 can operate as part of, or in communication with, a communications network (not shown in FIG. 1). As such, various entities may communicate with the mirror array display system 100 via direct connections and/or via network connections.

The mirror array display system 100 includes a controller 102. The functionality of the controller 102 can be provided by hardware and/or software. In the illustrated embodiment, the controller 102 includes one or more application programs such as, for example, an aiming module 104 and an image control module 106. While the aiming module 104 and the image control module 106 are illustrated as separate entities (components) in FIG. 1, it should be understood that a single application program can provide some or all of the functionality described herein with respect to the aiming module 104 and/or the image control module 106. Furthermore, although the aiming module 104 and the image control module 106 are illustrated as components of the controller 102, it should be understood that these and/or other modules (not shown in FIG. 1) may be embodied as one or more stand-alone devices or components.

The aiming module 104 can be configured to control alignments, orientations, modulation rates, and/or performance and/or other operating characteristics of various hardware and/or software components used to provide a display subsystem 108 of the mirror array display system 100. In particular, as will be described in more detail herein, the display subsystem 108 can include one or more lasers 110, one or more steering mirrors 112, one or more steering mirror motors 114, and one or more mirror arrays 116. A mirror array 116 can include a number of mirrors 118 and a number of motors 120. According to various embodiments, each of the mirrors 118 may be controlled by one of the motors 120, and the motors 120 can be operated by instructions or signals generated by the aiming module 104. It should be understood that these embodiments are illustrative, and should not be construed as being limiting in any way.

In some embodiments, the aiming module 104 can generate aiming parameters 122 for controlling the various components of the display subsystem 108. Thus, the aiming module 104 can be configured to output the aiming parameters 122, and various hardware components of the display subsystem 108 can be controlled by the aiming parameters 122. The aiming parameters 122 can include analog and/or digital control signals for modulating a beam emitted by one or more of the lasers 110, for driving one or more of the steering mirror motors 114 to orient one or more of the steering mirrors 112, and/or for driving one or more of the motors 120 to aim one or more of the mirrors 118. It should be understood that the aiming parameters 122 can be, but are not necessarily static quantities. As such, the aiming parameters 122 can include dynamic signals or other values that can change at any time. Because the aiming parameters 122 can control other performance aspects of the mirror array display system 100, it should be understood that these embodiments are illustrative, and should not be construed as being limiting in any way.

The functionality of the lasers 110 can be provided by various light emitting devices including, but not limited to, lasers. The lasers 110 can emit amplified light in various wavelengths and/or frequencies, as is generally understood. The lasers 110 can be modulated and/or can be pulsed. According to various embodiments, the lasers 110 can be modulated for brightness and/or to combine various colors of laser beams into a multi-colored image of a multi-colored object. The lasers 110 can also be modulated to illuminate objects and/or to form imagery in an interaction space associated with the mirror array display system 100.

According to various embodiments, the lasers 110 can be pulsed, switched, or optically chopped to emit, or appear to emit, bursts of light. The bursts of light from the laser 110 can be aimed at, or directed via the steering mirror or mirrors 112 to, the mirrors 118 of the mirror array 116. In some embodiments, the steering mirror or mirrors 112 can be omitted and each mirror 118 in the mirror array 116 can have a dedicated respective laser 110. In some embodiments, the lasers 110 themselves can be aimed. The steering mirror 112 and the mirrors 118 are described in more detail below. In some of these embodiments, the various mirrors described herein (the steering mirror 112 and the mirrors 118) can be sized such that an angular change during an interval when the beam is impinging on a mirror is short (and therefore reduces brightness relative to longer angular changes during the interval when the beam is impinging on the mirror). This can be accomplished by reducing the size of the mirrors 118 such that the beam impinges on the mirrors 118 for a short duration of time, relative to a duration of time during which the beam impinges on the mirrors 118 if sized larger. According to various embodiments, the lasers 110 can be pulsed or switched at rates of about a megahertz or more, thus enabling the lasers 110 to emit about one million real-image points, corresponding to convergence points, in a second.

The lasers 110 can be pulsed fast enough to light each mirror 118 in the mirror array 116 multiple times each second. The lasers 110 can be powered to overcome daylight and/or can be powered down to zero. Furthermore, the Helmholtz-Kohlrausch effect can cause saturated colors in narrow wavelengths to be perceived as up to fifty percent brighter than broad wavelengths of light such as, for example, light emitted by cathode ray tube ("CRT") displays, liquid crystal device ("LCD") displays, or the like. As such, the lasers 110 can produce bright vivid colors with little to no increase in power requirements relative to other lighting technologies. Because the lasers 110 can be configured to emit rays, embodiments of the mirror array display system 100 can be focus-free and the image field can extend almost any distance, limited only by the precision of beam aiming. Furthermore, in some embodiments, a laser, such as the laser 110, may not draw dark portions of an image, thereby providing a potential power savings.

The steering mirrors 112 can be used to aim light emitted by a light source, for example, laser beams emitted by the lasers 110. The aiming or steering of the light beams will be more clearly understood with reference to FIGS. 2-12 below but is briefly described here for clarity. An example of a laser beam emitted by the laser 110 is used for illustration, but should not be understood as being limiting. The laser 110 emits a laser beam toward the steering mirror 112. In some embodiments, the steering mirror 112 can be configured to oscillate in one axis and to be rotated or oriented along another axis by the steering mirror motor 114. The orientation of the steering mirror 112 can be precisely controlled and/or tracked by the controller 102. Furthermore, as explained herein, the aiming parameters 122 can include hardware controls for manipulating the steering mirror 112 via control of the steering mirror motor 114.

The steering mirror 112 may reflect, deflect, steer, and/or otherwise aim the light toward the mirror array 116 and, more specifically, toward some, none, or each of the mirrors 118 in the mirror array 116. According to various embodiments of the concepts and technologies disclosed herein, functionality of the steering mirror 112 and/or the mirrors 118 may be provided by metal-on-silicon resonant mirrors or microelectromechanical systems ("MEMS") mirrors. In some embodiments, the mirrors 118 may be designed to be closely packed together to reduce space between the reflective surfaces of the mirrors 118. In some embodiments, a number of the mirrors 118 may be packaged together or disposed onto a single substrate.

In some embodiments, the mirrors 118 can be sized from about 0.5 mm square or 0.5 mm diameter round to almost any dimensions up to several centimeters. The size of the mirrors 118 can limit the mirror spacing. As such, depending upon a distance of the viewer from the mirror array 116, the mirror size can affect the fineness of the real image, which can correspond to the pixel size in a conventional 2D display. Because image quality can be varied by varying sizes of the mirrors 118 and/or spaces between the mirrors 118, these embodiments are illustrative. Some embodiments of the steering mirrors 112 and the mirrors 118 have a resonant scan of sixty degrees at 250 Hz and/or can be controlled in a non-resonant axis at a rate of up to 100 Hz. One commercial example of a mirror/motor that can be used to provide the functionality of the mirror 118 and the motor 120 is available from Meric Technology. Furthermore, the resonant or non-resonant motions of the mirrors 118 and/or the steering mirror 112 can be synchronized with the pulsing or modulation of the laser 110. As such, some embodiments of the concepts and technologies disclosed herein allow images to be scanned by multiple mirrors 118 that can be synchronized to scan in unison, in time with modulation or pulsing of the laser 110. As used herein, a "scan" refers to a process whereby light emitted by the lasers 110 is directed to each designated subset mirror 118 in the mirror array 116 that is to be illuminated to project and/or draw an object or other imagery.

Some contemplated embodiments of the mirrors 118 includes a 2-axis (pitch and yaw) 20-mm-diameter steering mirror that swings through arcs of $\forall 24.0°$ with a pointing accuracy of 1 milliradian (mrad), mounted in a housing that is 1.2 inches square. One example of such a mirror/motor combination is available from Meric Technology. The above embodiment of the mirrors 118 can steer a beam through an angle of 48° in less than 60 ms. For a relatively smaller 10° move, the settling time can be less than 15 ms. As such, this mirror can target about fifty points per second, in accordance with the various concepts and technologies disclosed herein. The mirror 118 can be controlled by an SPI or UART electrical interface and software command set, which can be provided by the controller 102. The position of the mirror 118 can be optically encoded using a position sensor that provides feedback to the controller 102. As such, the mirror 118 can be positioned with an accuracy of 1 mrad (about 0.06 degrees) and repeatedly returned to the same position with an accuracy better than 1 mrad.

Figure 4:
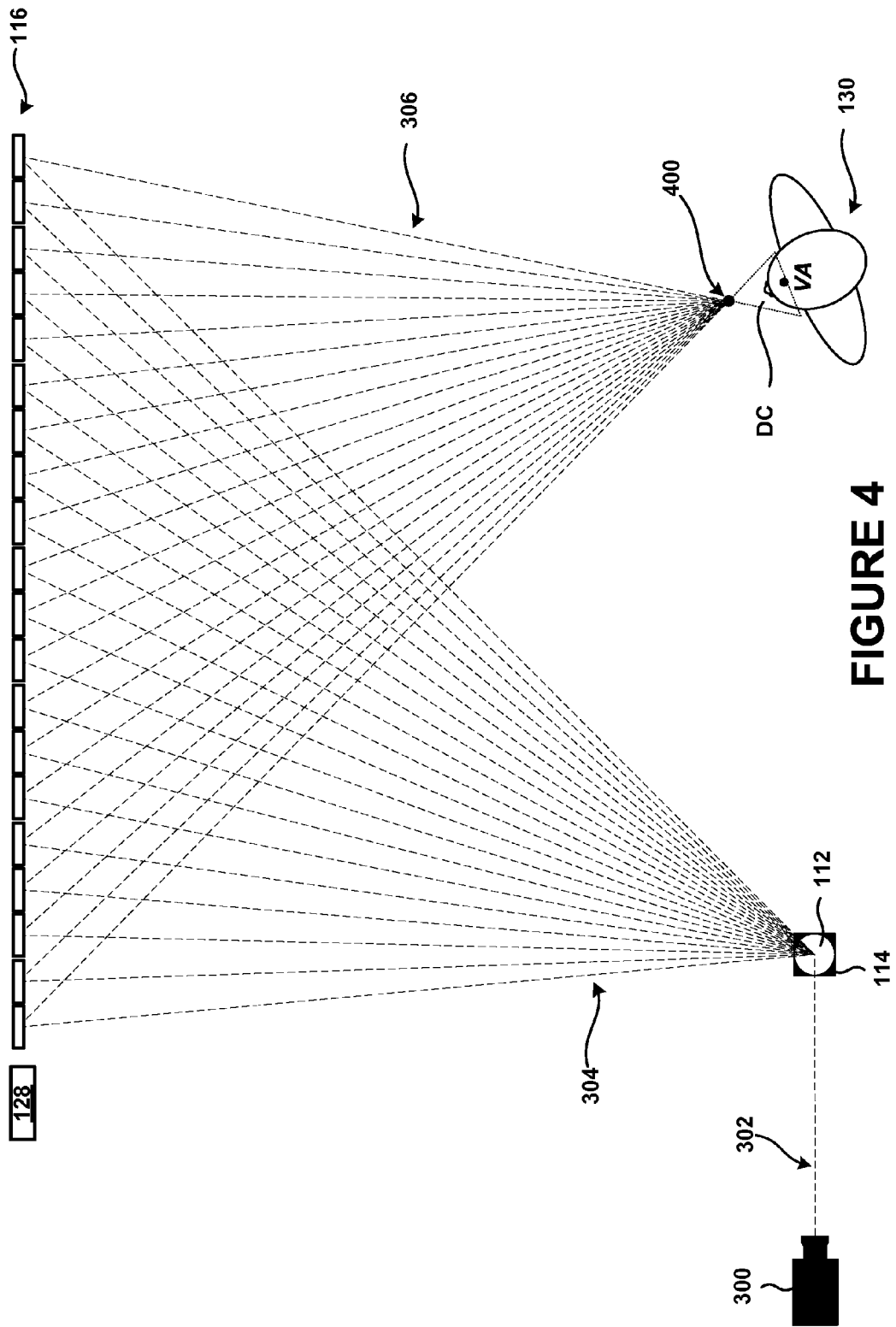
FIG. 4 is a line drawing illustrating additional aspects of the mirror array display system.
Figure 10:
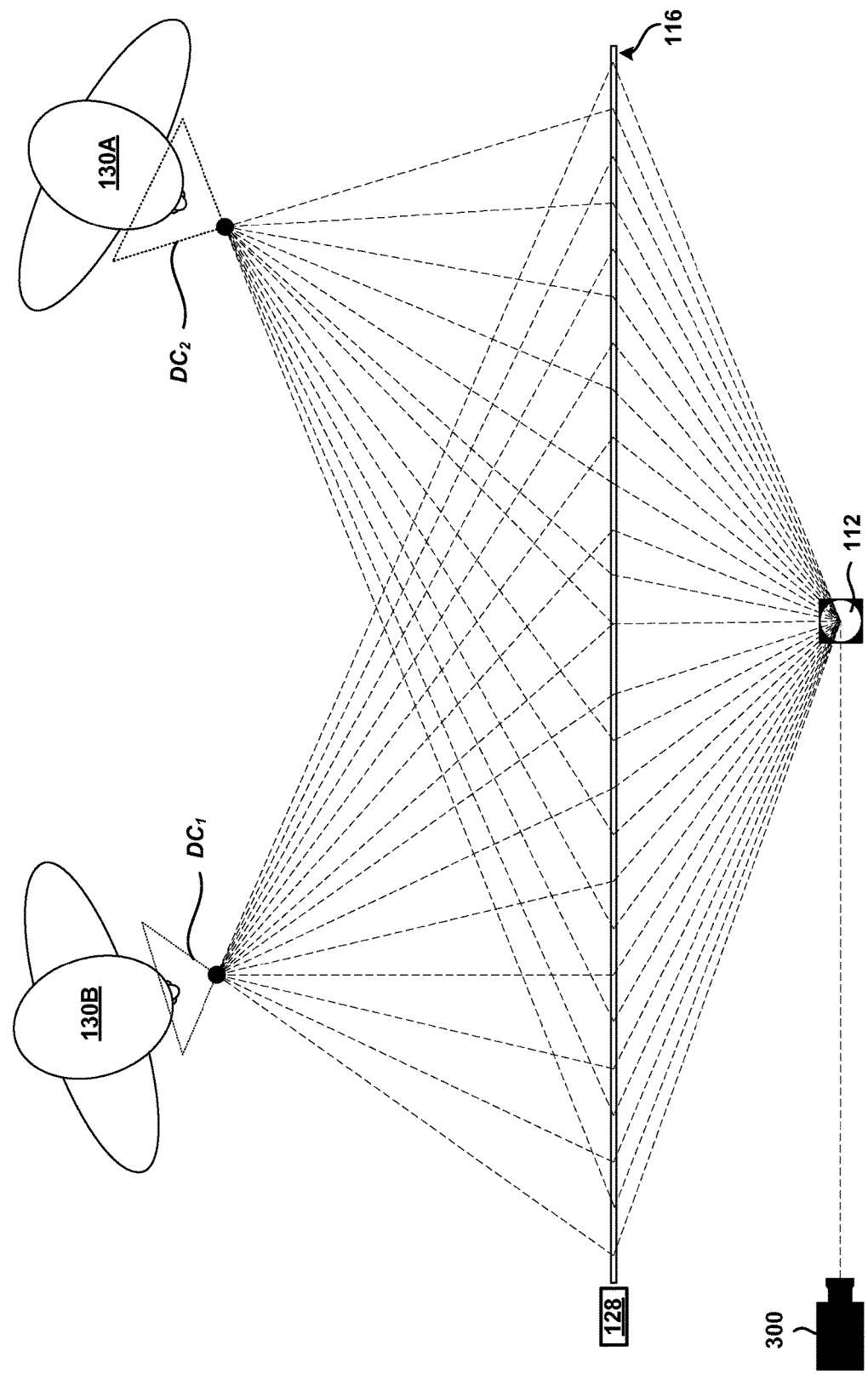
FIG. 10 is a line drawing illustrating additional aspects of the mirror array display system.

The image control module 106 can be configured to process one or more instances of visual content 124 and to configure the aiming parameters 122 such that the display subsystem 108 displays light for producing an image 126 corresponding to the visual content 124 (see FIG. 1). The single or multiple instances of visual content 124 (e.g., one or multiple images seen by a viewer 130 can be displayed by the mirror array display system 100 in accordance with the various embodiments disclosed herein. As such, it will be more clearly understood with reference to the description herein below that the mirror array display system 100 can display a single instance of visual content 124 (an example of which is shown in FIG. 4) and/or can simultaneously or separately display multiple instances of visual content 124 (an example of which is shown in FIG. 10).

One or more instances of visual content 124 can include two dimensional ("2D") content, three-dimensional ("3D") content, animated content, video, icons, desktops, still images, text, photographs, slide shows, presentations, other content, combinations thereof, or the like. The visual content 124 can be received at the controller 102 from one or more sources (not illustrated). In some embodiments, the visual content 124 can be received from one or more sources or devices configured to transmit, stream, broadcast, multicast, output, and/or otherwise provide the visual content 124 to the controller 102. Because the visual content 124 can include almost any kind of content, it should be understood that the above embodiments of the visual content 124 are illustrative, and should not be construed as being limiting in any way.

Similarly, the visual content 124 can be received at the controller 102 via one or more wired and/or wireless connections to various sources. According to various embodiments, the sources include, but are not limited to, media playback devices, computer readable media (as defined herein), one or more data streams, and/or other sources. The visual content 124 can also be obtained from various signal sources including, but not limited to, satellite sources, a connection to the Internet or other network connections, cable television sources, digital or analog antenna sources, set-top boxes, other sources, combinations thereof, or the like. It should be understood that the sources can also include any combination of virtual machines and/or other resources within a cloud computing or other environment. Thus, it should be understood that the visual content 124 can be received at the controller 102 via any suitable source via any number of wireless and/or wired connections or networks.

According to various embodiments, the mirror array display system 100 can also include a tracking system 128 for tracking position, movement, identity, and/or orientation of one or more viewers or other users ("viewers") 130. In some embodiments, the tracking system 128 can be configured to track position, movement, identity, and/or orientation of the viewer 130. In some other embodiments, the tracking system 128 can be configured to track position, movement, and/or orientation of eyes, a face, or appendages of the viewer 130. To provide these and other functions, the tracking system 128 can include and/or can access one or more or a combination of optical sensors, cameras, microphones or other sound sensors, radio frequency ("RF") devices, biometric sensors, pressure sensors, combinations thereof, or the like. The tracking system 128 can also use facial recognition, eye movement tracking, proximity sensing, and/or other software controls in association with various hardware to provide the functionality described herein. In some embodiments, optical sensors and/or cameras associated with the tracking system 128 can use light in visible and/or invisible spectrums to help enable tracking of bodies, eyes, and/or appendages of the viewer 130 in low-light conditions, to supplement other tracking technologies, and/or in other situations.

According to various embodiments, the tracking system 128 tracks positions, movements, identities, and/or orientations of the viewers 130 and generates tracking data 132 corresponding to and/or indicating the tracked information. The tracking data 132 can be obtained by the controller 102. The controller 102 uses the tracking data 132 to determine locations, orientations, and/or identities of viewers 130 and, based thereon, configures the aiming parameters 122 to direct the image 126 to the viewers 130. Illustrative embodiments of tracking movements of viewers 130 and configuring aiming parameters based upon tracking data 132 are described in detail herein, particularly with reference to FIGS. 3-12.

According to various embodiments, the mirror array display system 100 forms the image 126 as a real image in a space in front of a surface such as a wall to which the mirror array 116 is attached or other surface. According to various embodiments, the mirror array display system 100 forms the image 126 using laser beams directed by the steering mirror 112 and a number of the steerable mirrors 118 that can be arrayed in the surface. Some, none, or each of the mirrors 118 can be steered or orientated by various servomechanisms such as the motors 120 under the control of the controller 102 or other processor. In some arrangements, each laser beam can be aimed at the steering mirror 112, which can direct the laser beam in rapid succession to a series of secondary mirrors, each of which in turn can scan the beam over a series of tertiary mirrors. The tertiary mirrors can be arranged in a line in such a way that the laser beam directed from the secondary mirror scans over a row of the tertiary mirrors, each of which can be individually tilted by the controller 102 to send the beam to a particular point in space to form the image 126. In some embodiments, the line of tertiary mirrors can be a vertical column in a planar rectangular array of mirrors 118 such as the mirror array 116 illustrated in FIG. 2.

Because a laser beam can be thin and linear, the laser beam can act as a ray of geometrical optics. As such, the terms "beam" and "ray" are used herein interchangeably. The controller 102 can access a list of virtual-image point locations, e.g., from a list stored in a memory, and can issue the aiming parameters 122 to steer or aim the mirrors 118 to direct laser beams, or pulses of the laser beams, toward each convergence point. As such, the mirror array display system 100 can create the image 126 such as a real image. A point of the image 126 can be seen at any place that is more distant from the mirror array 116 than a convergence point of the beams. The aimed beams can diverge from the convergence point and enter eyes of the viewer 130. The viewer 130 can see a single point of light located at the convergence point and this single point of light can correspond to a point on a surface of an object such as the image 126.

Each point on the imaged object can emit light toward eyes of the viewer 130 from the convergence point. Each ray of light can arrive at a convergence point from different directions over a solid angle, which can correspond to different mirrors 118. Diverging from the convergence point, the rays can mimic the light from a corresponding point on a real image corresponding to an actual object. Each point can be scanned sequentially and the viewer 130, therefore, can see an entire object (real image) floating in space in front of the mirror array 116. An example of this is shown in FIG. 9. In light of the above, it can be appreciated that a viewing area of a viewer 130 can be past a convergence point of light beams emitted by the mirror array display system 100, as shown in the FIGURES. That is, the convergence point CP can lie between the mirrors 118 and the viewer 130.

One aspect of image quality can be an angular extent of the image, which is limited to the angular extent of the array of mirrors 118 from the viewing area of the viewer 130. Another aspect of image quality can be density of the converging rays. If the rays are not close together angularly (i.e., angularly dense), the image 126 can appear to have voids or holes between points of light. That is, if the mirrors 118 do not have a large enough area density, then the image will lack detail, especially when the viewer 130 is close to the array of mirrors 118. In some embodiments, the mirrors 118 can be located close together to provide dense rays and in other embodiments, having sparse rays can be acceptable, for example, when the image 126 does not need to appear solid or realistic. An icon, for example, may not need to mimic a real object and therefore may not need fine detail as long as a surface of the icon is smooth enough that it has a definite shape. It should be understood that when the rays are angularly sparse, an object can still be imaged in detail by making the image larger, or, by moving the viewer 130 and/or the image 126 away from the mirror array 116.

Thus, if for example viewers 130 are expected to approach the mirror array 116 to within about a few feet, for example about four feet, the mirrors 118 may be sized and spaced at various distances such as, for example, four millimeters, thereby providing a two-millimeter point-to-point resolution in the image 126 halfway between the viewer 130 and the mirror array 116. The fineness of the image can be similar to that of an image on paper or a 2D display made up of 2-millimeter diameter pixels and held two feet away. While such an embodiment may appear coarse to the viewer 130, such an embodiment could be used for icons, large lettering, and/or other information that may not require fine detail. Similarly, a density of the mirrors 118 can be related to a pixel density, but also to voids between the mirrors 118. If the image 126 formed with points of light visibly scattered over their surfaces are usable, then the area density of mirrors 118 on the mirror array 116 can be lower than may be required if high detail is desired. The number of rays for each point and the number of mirrors 118 for an object thus can be a function of the required image 126 fineness. The number of rays can be reduced by targeting individual viewers 130, as discussed herein.

In an alternative embodiment, one or more of the mirrors 118 can be turned by one or more motors 120 in synchronization with sweeping and/or modulation of a laser beam so as to send plural beams to a single convergence point $p_i$ from different portions of the mirror 118, thus mimicking the action of a number of smaller, independently-operable mirrors 118 and increasing the amount of detail in the image 126 without decreasing the mirror size. For example, a mirror 118 can be turned so that at one time it reflects an impinging laser beam to the convergence point $p_i$ from an upper-left corner portion of the mirror 118, and a short time later reflects the same or a different laser beam from a different portion of the mirror 118, to the same convergence point $p_i$. Thus, according to this embodiment, the area of the mirror 118 can be subdivided into portions, each portion corresponding to a pixel in a 2D display and acting independently of adjoining or other portions of the same mirror 118, to increase the fineness and detail of the projected image 126. Portions of the mirror 118 can target the same convergence point $p_i$ from different angles in any sequence or pattern, or may target different points $p_i$, $p_q$ in the same sequence or pattern, or, in another sequence or pattern. In one embodiment, the laser 110 may be dedicated to a specific portion (or portions) of each one of many mirrors 118, or, one laser 110 may be dedicated to one or several adjacent mirrors 118, and target portions in a repeating pattern. Any pattern that results in presenting a desired image 126 to the view can be used.

According to various embodiments, one or more aiming algorithms can be used to determine aiming parameters 122 and/or otherwise to control the mirror array display system 100. According to various embodiments, if the mirror array display system 100 is used to display two different images to multiple viewers 130, an aiming algorithm can include determining positions of faces or eyes of the viewers 130, relative to a set of coordinates fixed relative to the mirror array display system 100. The distances can be calculated from images from cameras or by other means. The coordinates can be determined as Cartesian coordinates, for example with x, y, and z coordinates representing respectively each viewer's position, height from the floor, and distance from the mirror array 116. For a first viewer 130, each point $p_i$ of the real image to be seen by the first viewer 130 can be determined and the controller 102 can calculate a ray passing to the center of the viewer's face through the real image point or convergence point, and where that ray intersects the mirror array 116. The trajectory of this ray can be determined from a line equation given the position of the convergence point in x, y, and z coordinates, and the respective differences between the convergence point and the x, y, and z coordinates corresponding to the viewing area at the face of the viewer 130, using the slope and intercept method.

In some embodiments, the controller 102 can assign an area of the mirror array 116, for example an area surrounding the point on the mirror array 116 at which a ray drawn from a point on the face of the viewer 130 and through a real image point, corresponding to a convergence point, extends to intersect the mirror array 116. The controller 102 can assign this area of the mirror array 116 to send rays through the convergence point and to the face of the viewer 130. These rays can together form a solid double cone of light beams with the apex at the convergence point $p_i$. The controller 102 can calculate the angle of the mirrors 118 at each location within this mirror array 116 so that the laser beam scanning over the mirrors 118 will, at the instant it hits each mirror 118, be reflected to the convergence point $p_i$ and thence progress to the viewing area at the face of the viewer 130. The mirror 118 can be moved to the correct orientation by the motor 120. A laser beam flash can be aimed precisely to the convergence point $p_i$ by timing the flash of light (i.e., by modulating the laser) such that the laser is firing at the instant the mirror 118 is at the precise angle to reflect the beam to the desired convergence point $p_i$, creating a point of light.

The controller 102 can repeat the process above for each point $p_i$, i=1, 2, 3 ..., n−1, n of the real image that the first viewer 130 is to see. There are various ways to arrange the scanning so that a beam can be sent through each point in the real image for the first viewer 130 within the time of persistence of vision so that the image will appear steady. Each mirror 118 can send rays to the point $p_i$ of the real image, but also can send rays to an adjoining point $p_q$ of the real image because, due to the size of the face of the first viewer 130 face, rays can be sent to the point $p_i$ from a set of adjoining mirrors 118, and likewise rays can be sent to the point $p_q$ from a set of adjoining mirrors 118. The two sets of adjoining mirrors 118 can nearly overlap, so that each mirror 118 in the overlap area can send rays to both of the points $p_i$ and $p_q$. The amount of overlap can decrease as the mirror array display system 100 is targeted more narrowly to a face or just the eyes of the viewer 130. Furthermore, the amount of overlap, and the area of the mirror array 116 used to produce each point $p_i$, can decrease as the tracking system 128 more accurately locates and targets the viewer's eyes.

As such, a decrease in the area of the mirror array 116 used to target the viewer 130 and create a real image of the visual content 124 for that viewer 130 also can decrease the amount of time during which a scanning laser beam is aimed at each viewer 130, thereby decreasing ray and angle computation, allowing more people to use the system 100, and improving energy efficiency. In some embodiments, an optimum efficiency arrangement can correspond to an embodiment in which each mirror 118 sends exactly two rays to each point $p_i$, one ray directly into each eye of the first viewer 130. In some other embodiments, a less-than-optimum efficiency arrangement can correspond to embodiments in which larger regions, relative to the optimum efficiency arrangement described above, of the viewer's face are targeted. In such embodiments, more of the mirrors 118 can be used to send rays toward the viewer 130 when creating a convergence point of the real image. The scanning beam or beams can hit every mirror 118 in the mirror array 116 that is behind a convergence point, as seen by the first viewer 130, when forming not only a real image of a 3D object floating in space, but also a backdrop of the real image.

If the second viewer 130 is to see the same real image as the first viewer 130, then the procedure outlined above can be augmented (or, expanded) by sending rays to each point $p_i$ of the real image from additional areas corresponding to a cone intersecting a face or eyes of the second viewer 130. As the first viewer 130 and the second viewer 130 move closer or farther from each other, the areas on the mirror array 116 that are sending rays through the point $p_i$ can also move closer or farther. This can be true whether there are two real images in two image locations (each point $p_i$ of the real image is in two places, one corresponding to one viewer's real image and one to the other's), or only one image (there is only one point $p_i$ of one real image, viewed by both viewers). In the latter case, the two viewers 130 can see the imaged object from different perspectives. If, however, the second viewer 130 is to see a different real image, the procedure outlined above can be recreated with different real image points $p_j$ that have x, y, and z coordinates different from those of the first points $p_i$. The ray computations, the mirror angles, and the laser timing can be similar to, but independent of, the computations completed for sending the rays that create the first image 126 for the first viewer 130. Thus, in some embodiments, the only interaction between the two images 126 can be where the active areas on the mirror array 116 overlap. In such overlap areas, the ray-sending calculations may be complicated by the fact that each mirror 118 may send rays to two different images 126, which can involve larger changes in mirror orientation. This added complication, however, may not be different in principle from the complications resulting from rapid movements or changes to the real image 126 seen by the single viewer 130. One scanning approach for two or more independent images 126 can be to alternate the scans, with the mirrors 118 first creating the first image 126 for the first viewer 130, and then creating the second image 126 for the second viewer 130. If each scan can be done in a tenth of a second or faster, then both images 126 can be stable due to the persistence of vision. Additional lasers 110 can be added to the mirror array display system 100 as needed or desired.

The mirror array display system 100 can also include other hardware 134. The other hardware 134 can include display cases, mounts, supports, or other mounting hardware; accelerometers, magnetometers, gyroscopes, and/or other orientation sensors; proximity, infrared, temperature, sound, and/or other ambient condition sensors; processors; memory devices; combinations thereof, or the like. As such, the mirror array display system 100 can include various hardware associated with computer systems, mobile telephones, display systems, cameras, other devices, or the like. It should be understood that these embodiments are illustrative, and should not be construed as being limiting in any way.

The other hardware 134 can be used in addition to, or instead of, the tracking system 128 to track movement of a viewing area. In particular, in some embodiments, an orientation sensor of a mobile device that includes a mirror array display system 100 can be used to determine a rotation angle through which the device is rotated. For example, an accelerometer, gyroscope, or other orientation sensor can measure rotation of the device, if desired. The controller 102 can use the measured rotation to determine, using the orientation sensor, a rotation point associated with the mirror array display, an amount the device is moved, relative to the rotation point, and the rotation angle based, at least partially, upon the movement. The image 126 projected by the mirror array display system 100 can be modified, in response to the determined rotation, rotation point, and/or other aspects.

Although not illustrated in the FIGURES, various embodiments of the mirror array display system 100 can include light sensors embedded in the mirror array 116. The light sensors can be configured to register a time at which the laser beam or other light strikes the light sensors, corresponding to scanning of a proximately located mirror 118, and to report the time to the controller 102. The controller 102 can use this information to synchronize pulsing of the laser 110 and/or rotation of the mirrors 118 and/or the steering mirror 112 to control performance of the mirror array display system 100.

FIG. 1 illustrates one controller 102, one display subsystem 108, and one tracking system 128. It should be understood, however, that some implementations of the mirror array display system 100 include multiple controllers 102, multiple display subsystems 108, and/or multiple tracking systems 128. Thus, the illustrated embodiments should be understood as being illustrative of some examples of the mirror array display system 100, and should not be construed as being limiting in any way.

Figure 2:
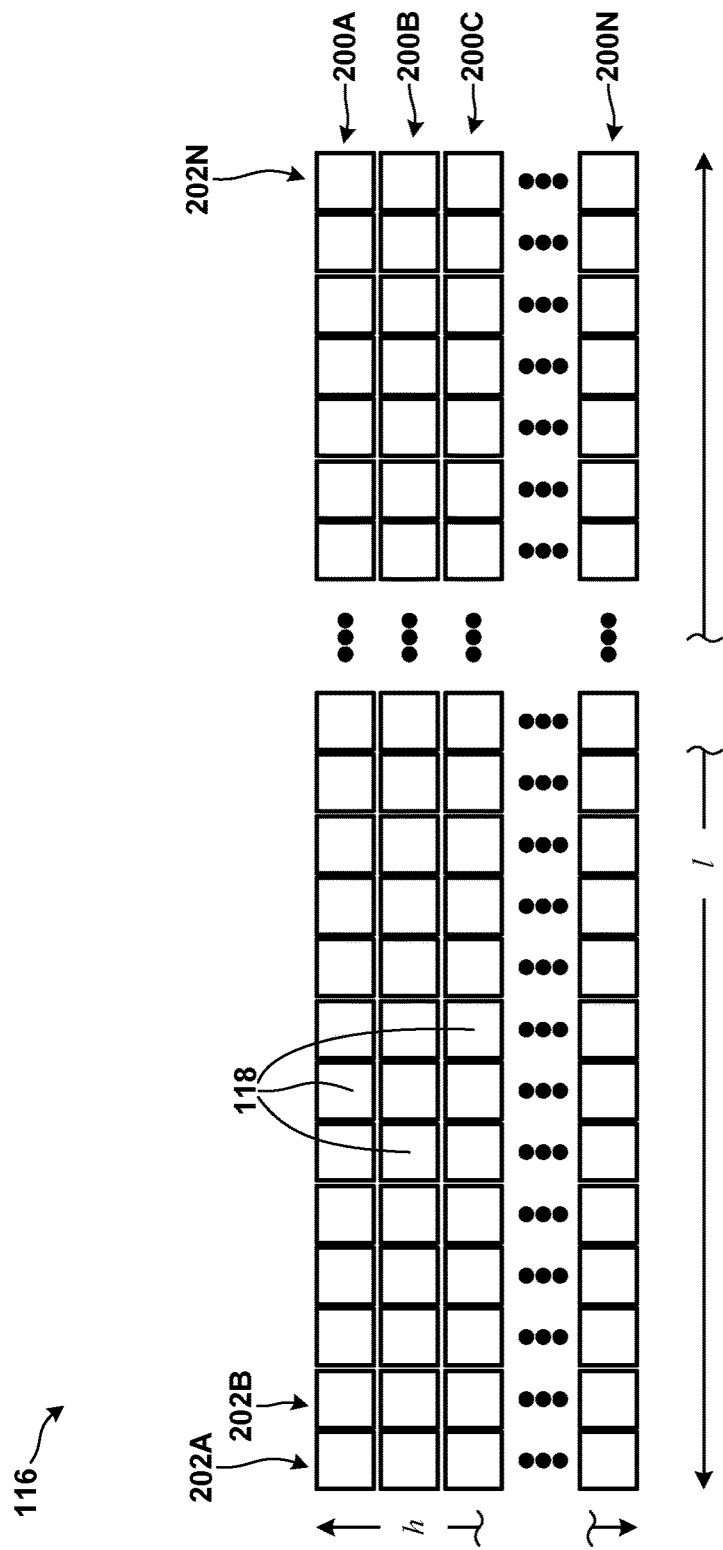
FIG. 2 is a line drawing illustrating additional aspects of the mirror array display system.

Turning now to FIG. 2, additional aspects of the mirror array display system 100 will be described in detail. FIG. 2 is a line drawing illustrating additional aspects of the mirror array display system 100, arranged according to at least some embodiments presented herein. In particular, FIG. 2 illustrates a front elevation view of a mirror array 116, according to some embodiments. The mirror array 116 includes a number of mirrors 118, as described above with reference to FIG. 1. While the mirrors 118 are illustrated in FIG. 2 as having a square profile, it should be understood that this embodiment is illustrative. In particular, various embodiments of the concepts and technologies disclosed herein make use of alternatively shaped and/or configured mirrors 118. As such, the illustrated embodiment should be understood as being illustrative, and should not be construed as being limiting in any way. Furthermore, the mirrors 118 of the mirror array 116 can be deployed in various configurations in addition to, or instead of, the illustrated rectangular arrangement having rows and columns. As such, the illustrated embodiment should be understood as illustrative of one example of a mirror array 116 and should not be construed as being limiting in any way.

The illustrated rectangular embodiment of the mirror array 116 includes one or more rows 200A-N (hereinafter collectively and/or generically referred to as "rows 200") of mirrors 118. The mirrors 118 can also be arranged in one or more columns 202A-N (hereinafter collectively and/or generically referred to as "columns 202"). As shown in FIG. 2, the mirror array 116 can have a height h, and the rows 200 can be arranged along the height h of the mirror array 116. Similarly, the mirror array 116 can have a length l, and the columns 202 can be arranged along the length l of the mirror array 116. Although not visible in FIG. 2, each of the mirrors 118 can include the motor 120 or other hardware for moving and/or orienting the mirror 118 and/or a reflective surface of the mirror 118. As explained above with reference to FIG. 1, the motor 120 can oscillate the mirror 118 to deflect, reflect, or otherwise aim light emitted from a light source. It should be understood that the embodiment illustrated in FIG. 2 is illustrative, and should not be construed as being limiting in any way.

Figure 3:
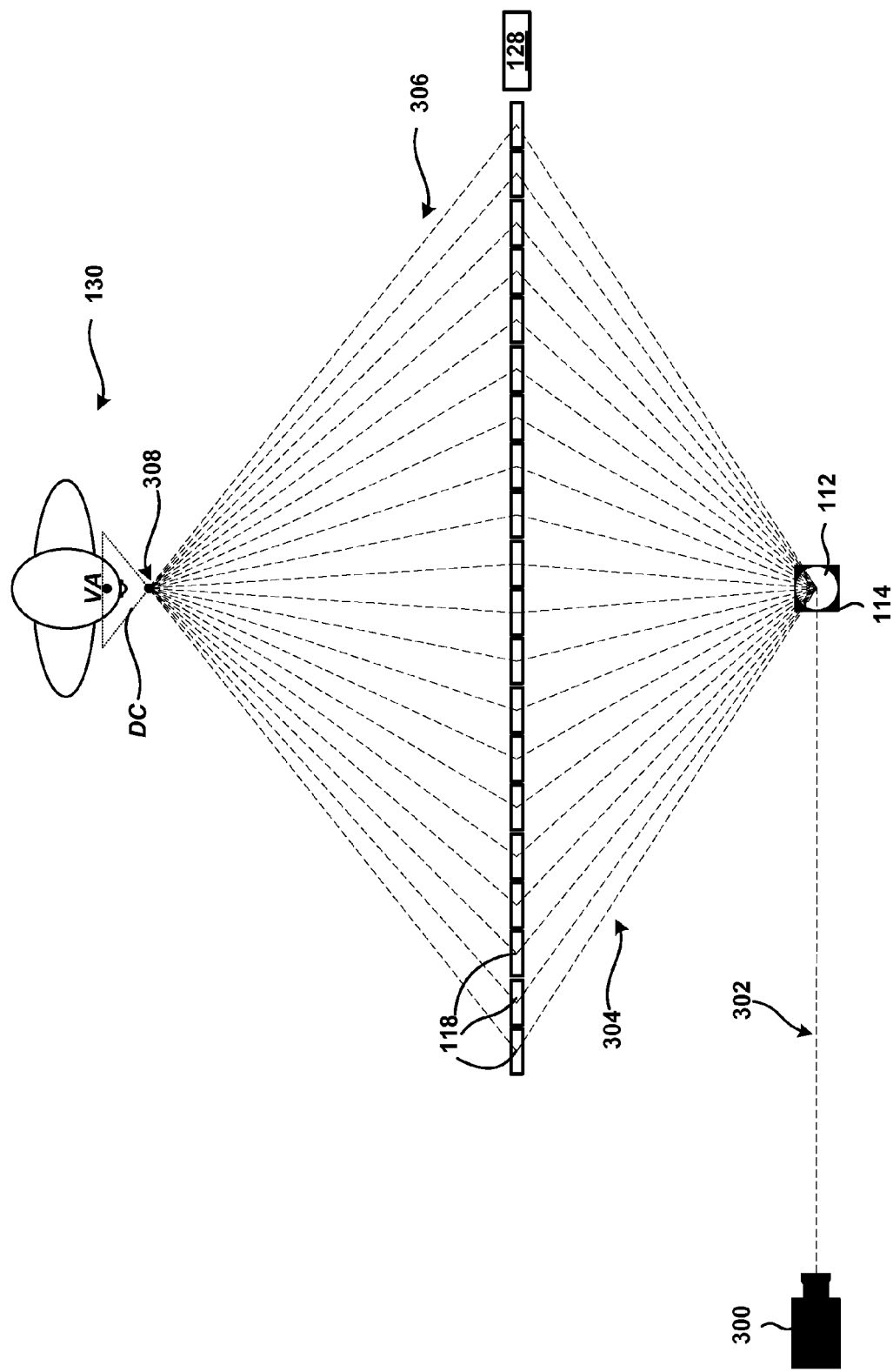
FIG. 3 is a line drawing illustrating additional aspects of the mirror array display system.

Referring now to FIG. 3, additional aspects of the mirror array display system 100 will be described in detail. FIG. 3 is a line drawing illustrating additional aspects of the mirror array display system 100, arranged according to at least some embodiments presented herein. FIG. 3 shows a top view of the mirror array 116 shown in FIG. 2. As shown in FIG. 3, a light source 300 emits light 302. According to some embodiments, the functionality of the light source 300 can be provided by the laser 110 and the light 302 emitted by the light source 300 can correspond to a modulated laser beam. For purposes of illustrating and describing the various embodiments disclosed herein in detail, the light source 300 is referred to herein as the laser 110 and the light 302 is referred to as light or, in some instances, as a light beam or a laser beam. Because other light sources and/or types of light or light beams can be used in accordance with the concepts and technologies disclosed herein, it should be understood that this embodiment is illustrative, and should not be construed as being limiting in any way.

The light 302 can be directed toward and strike the steering mirror 112. As noted above with reference to FIG. 1, the steering mirror 112 can be coupled to and/or include a motor such as the steering mirror motor 114 described above to move, rotate, orient, and/or otherwise aim the light 302 emitted by the light source 300 toward the mirrors 118. As explained above, the mirrors 118 can also be oscillated. In particular, the steering mirror motor 114 can orient a reflective surface of the steering mirror 112 to direct the light 302 toward the mirrors 118. Thus, as shown in FIG. 3, reflected beams 304 corresponding to the light 302 reflected by the steering mirror 112 can be directed toward the mirrors 118. In some embodiments, the light 302 can be modulated and the steering mirror 112 can be moved at a rate substantially equivalent to the modulation rate of the light 302. As such, pulses of the light 302 can strike the steering mirror 112 and the steering mirror 112 can move between each pulse of the light 302 and direct beams of the light 302 toward respective ones of the mirrors 118. The steering mirror 112 can also direct beams toward respective portions of the ones of the mirrors 118, as mentioned above.

As such, the pulsing of the light 302 in combination with movements of the steering mirror 112 can be collectively or independently used to direct light pulses to each of the mirrors 118 in successive or randomized fashion. In one embodiment, mirrors 118 of the mirror array 116 or portions of the mirrors 118 can be lit in sequence by the modulated light 302 and the mirrors 118 can be aimed to direct the reflected beams 304 toward the viewer 130 as aimed beams 306. The aimed beams 306 can be focused on a convergence point 308, which can correspond to a single point p of the real image, as discussed above. After passing through the convergence point 308, the aimed beams 306 can form a divergence cone DC corresponding to paths along which each of the aimed beams 306 continue. It can be appreciated from the description herein that rays diverging from the convergence point 308 can correspond to and illuminate a viewing area, which might correspond to the face, eye region, or pupils of the viewer 130. As shown in FIG. 3, the viewing area can correspond to the approximate center of the eyes of the viewer 130 and the convergence point 308 can be in front of the viewing area. It should be understood that this embodiment is illustrative, and should not be construed as being limiting in any way.

In one contemplated variation (not illustrated), the image 126 can appear to be located behind a mirror array 116, rather than in front of the mirror array 116. In particular, because the mirrors 118 can deflect a ray at an arbitrary angle, the rays can be arranged to diverge from a point behind the mirror array 116 rather than from a point in front of the mirror array 116, although the rays still can originate at the mirror array 116. As such, if the image 126 is behind the mirror array 116, then the image 126 can be a virtual image that has no convergence point, rather than a real image as described in detail herein. In some embodiments, virtual images behind the mirror array 116 can be combined with real images in front of the mirror array 116, since mirrors 118 not used for virtual images can be used for real images and vice versa. Thus, embodiments of the concepts and technologies disclosed herein can be used to provide 3D images that appear to extend in depth from close to the viewer 130 out to any distance, including infinity. It follows that the display system 100 can also project images 126 confined to a plane, such as a drawing that appears to be printed on curved paper hanging in space. In particular, the display system 100 can also present a planar image that appears to coincide or nearly coincide with the mirror array 116. Thus, the display system 100 can mimic an ordinary 2D display, and can be configured to present images indistinguishable from those presented by, for example, a conventional laptop screen. Thus, if the display system 100 is incorporated into a laptop, it can be configured to provide not only the possibility of 3D images for menu navigation, cursor control, and similar tasks, but also to present other views such as the usual typing screen with a greatly reduced energy drain. As mentioned elsewhere, by targeting eyes of the viewer 130, the display system 100 can show images 126 with much higher energy than can a 2D display, which radiates light in all directions, while at the same time presenting images 126 that are more colorful and brighter.

According to various embodiments of the concepts and technologies disclosed herein, movements of the steering mirrors 112 and the mirrors 118 can be minimized to reduce motion and to reduce computational demands on the controller 102 or other processor controlling movements of the steering mirrors 112 and the mirrors 118. In some embodiments, for example, one of the columns 202 of mirrors 118 can be rotated about a vertical axis (e.g., an axis that runs through the column 202 parallel to the length l illustrated in FIG. 2) during one scan or pass of the column 202, thereby resulting in illumination of one vertical slice of the image 126 after another. In a subsequent scan, the mirrors 118 in the column 202 may be illuminated in a reverse direction or sequence. As such, the lasers 110 and the steering mirrors 112 and the mirrors 118 may cooperate to reduce movements of the various components of the display subsystem 108. It should be understood that this embodiment is illustrative, and should not be construed as being limiting in any way.

Due to human persistence of vision, light can appear to be substantially steady if pulsed at a rate of 15-20 Hz. In some instances, however, low repetition rates such as 5-6 Hz may result in some actual and/or perceived flicker. In some embodiments, multiple lasers 110 can be used and/or high wattage lasers 110 can be used to reduce the flicker by scanning multiple times per second at rates that exceed the rate of persistence of vision. In some embodiments, each scan can be completed within a time of persistence of vision, as described herein. The number of light beams needed for the mirror array display system 100, within the time of persistence of vision, can be calculated as being equal to a number of points on surfaces of imaged objects in the image 126 multiplied by a steradian density of the light beams multiplied by the steradian angle of projection, e.g., an angle subtended by the mirror array 116 a convergence point. A steradian point density can include a number of image 126 points in a solid angle. The above-calculated number can be reduced if there is no need to image the background as well as the objects of interest, but the number may be large relative to a number of light points in a 2D display. In some embodiments, however, the number of light points can be reduced by the controller 102 using image-recognition software to locate eyes of the viewer 130 to reduce the size of the divergence cone of rays at viewing area, and therefore reduce the area on the mirror array 116 that sends rays to the viewer 130.

According to various embodiments, viewers 130 near the mirror array display system 100 can be located using cameras and software, distance sensors, and/or other localization devices. These and other devices, which can be included as part of the tracking system 128 described above, can be used to determine a position of viewers 130 and heads, eyes, and/or other appendages of the viewers 130. Based upon a location of the eyes, for example, the controller 102 can determine an included angle of the ray-divergence cone from any real-image point, corresponding to a convergence point, to the eyes of the viewer 130 and also the direction of a cone axis, which can be aimed at, for example, the bridge of the nose of the viewer 130. Thus, the controller 102 can extrapolate the convergence cone and determine what mirrors 118 of the mirror array 116 are to be illuminated to reflect, deflect, or otherwise aim light from the lasers 110 toward the real-image point, corresponding to the convergence point, to create the image 126 for the viewer 130. In some embodiments, a circle shaped area of the mirror array 116 may not be used, rather, the area of the mirror array 116 used to aim the rays can correspond to a horizontal ellipsoid or a rectangle to reduce the number of mirrors 118 used to project the image 126. It should be understood that these embodiments are illustrative, and should not be construed as being limiting in any way.

In some embodiments, the cone of light can be narrowed to reduce the number of rays needed for imaging, and therefore reduce the number of mirrors 118 that are used to direct laser beams. With accurate user localization (as described above and with reference to the tracking system 128 herein) that permits ray-targeting to eyes of the viewer 130, the number of rays and the number of active mirrors 118 can be reduced further. According to some embodiments, extremely accurate localization can be used to direct a single ray of light toward an optical center of each eye of the viewer 130 (near the iris opening) and the number of rays for each point can therefore be reduced to one for each eye, with the divergence cone reduced to zero degrees. Such embodiments can limit the number of mirrors 118 used at any one time for imaging and, therefore, can increase the number of simultaneous users or the number of real images, or decrease the control bandwidth, for example. It should be understood that this embodiment is illustrative, and should not be construed as being limiting in any way.

In some other embodiments a mobile device or tablet computer, for example, a camera and/or range detector, is used to locate positions and orientations of pupils of eyes of the viewer 130 in space. Thus, two rays can be sent through each convergence point, one ray to each eye, from the mirrors 118 in line with the pupils and the convergence point. In these embodiments, the mirror array display system 100 can produce a three-dimensional image 126 in front of the mirror array display system 100. In some embodiments, this approach can use a number of mirrors 118 that can be two times a number of pixels used by a 2D display to create an image comparable to the image 126 created by the mirror array display system 100. The above approaches to user targeting can be used by the controller 102 to ensure that the data rate for the mirror array display system 100 projecting 3D content can be still roughly equivalent to a data rate for a 2D display.

It can be appreciated that although each active area on the mirror array 116 (for example, each mirror 118) can be associated with two angles as well as with a brightness and a color, the instantaneous active area (the area emitting light) can be smaller than an active area of a 2D display (the entire area of which must emit light). An additional reduction in the number of rays can be achieved in some embodiments by having the controller 102 obtain tracking data 132 for tracking a gaze or other eye- or face-orientation information relating to the viewer 130. The controller 102 can reduce a steradian density of laser beams coming from directions other than the direction in which the viewer 130 is looking. In some embodiments, the resolution in the center of the visual field can remain high, while peripheral areas of the visual field may lose resolution, all without affecting the image quality. It should be understood that this embodiment is illustrative, and should not be construed as being limiting in any way.

Turning now to FIG. 4, additional aspects of the mirror array display system 100 are described in detail, according to an illustrative embodiment. FIG. 4 is a line drawing illustrating additional aspects of the mirror array display system 100, arranged according to at least some embodiments presented herein. As shown in FIG. 4, the light source 300, the steering mirror 112, the steering mirror motor 114, the viewer 130, and/or the convergence point 308 can be located on a same side, or different sides, of the mirror array 116. With collective reference to FIGS. 3 and 4, it can be appreciated that the viewer 130 can be located on an opposite side of the mirror array 116, relative to the light source 300 as illustrated in FIG. 3 or a same side as the light source 300 as illustrated in FIG. 4. In the embodiment illustrated in FIG. 3, the mirrors 118 may be less efficiently used than the mirrors 118 in the embodiment shown in FIG. 4 because the mirrors 118 in the embodiment shown in FIG. 4 may need to be turned sideways to the plane of the array. In this case, the mirrors 118 may be replaced with refracting elements such as transmission diffraction gratings that can precisely divert the path of a monochromatic laser beam as a function of the beam/grating angle without departing from the scope of the concepts and technologies disclosed herein. Furthermore, two gratings in series could replace one mirror 118. Also, mirrors and diffraction gratings could be combined in one array, for example, to achieve a low-profile device (fixed mirrors to deflect a scanning beam out of the plane of the device, and gratings to turn it to a desired angle, for example). As such, for purposes of the description and claims, the term "mirror" can include one or more "diffraction gratings." The mirror array 116 thus can have both mirrors and diffraction gratings, only mirrors, or only diffraction gratings.

Although not shown in the FIGURES, it further should be appreciated that the light source 300 can be located on a first side of the mirror array 116 and the steering mirror 112 can be located on a second side of the mirror array 116, if desired. Also, though not shown in the FIGURES, various components of the display subsystem 108 can be located on either or both sides of the mirror array 116 and/or multiple instances of these components can be included. These and other aspects of the mirror array display system 100 can be dependent upon user preferences, physical limitations, available space, and/or other considerations.

As shown in FIG. 4, the reflected beams 304 can be directed to the mirrors 118 by the steering mirror 112. The mirrors 118 reflect or direct the reflected beams 304 and reflect aimed beams 306 to the convergence point 400. As explained above, the aimed beams 306 can pass through the convergence point 400 and form a divergence cone DC. As such, the light source 300 emits the light 302, the light 302 strikes the steering mirror 112, the steering mirror 112 redirects or otherwise aims the light 302 toward the mirror array 116 as the reflected beams 304, and the mirror array 116 can be configured to reflect, deflect, direct, or otherwise aim the reflected beams 304 to the convergence point 400 as the aimed beams 306. It should be understood that this embodiment is illustrative, and should not be construed as being limiting in any way.

Figure 5:
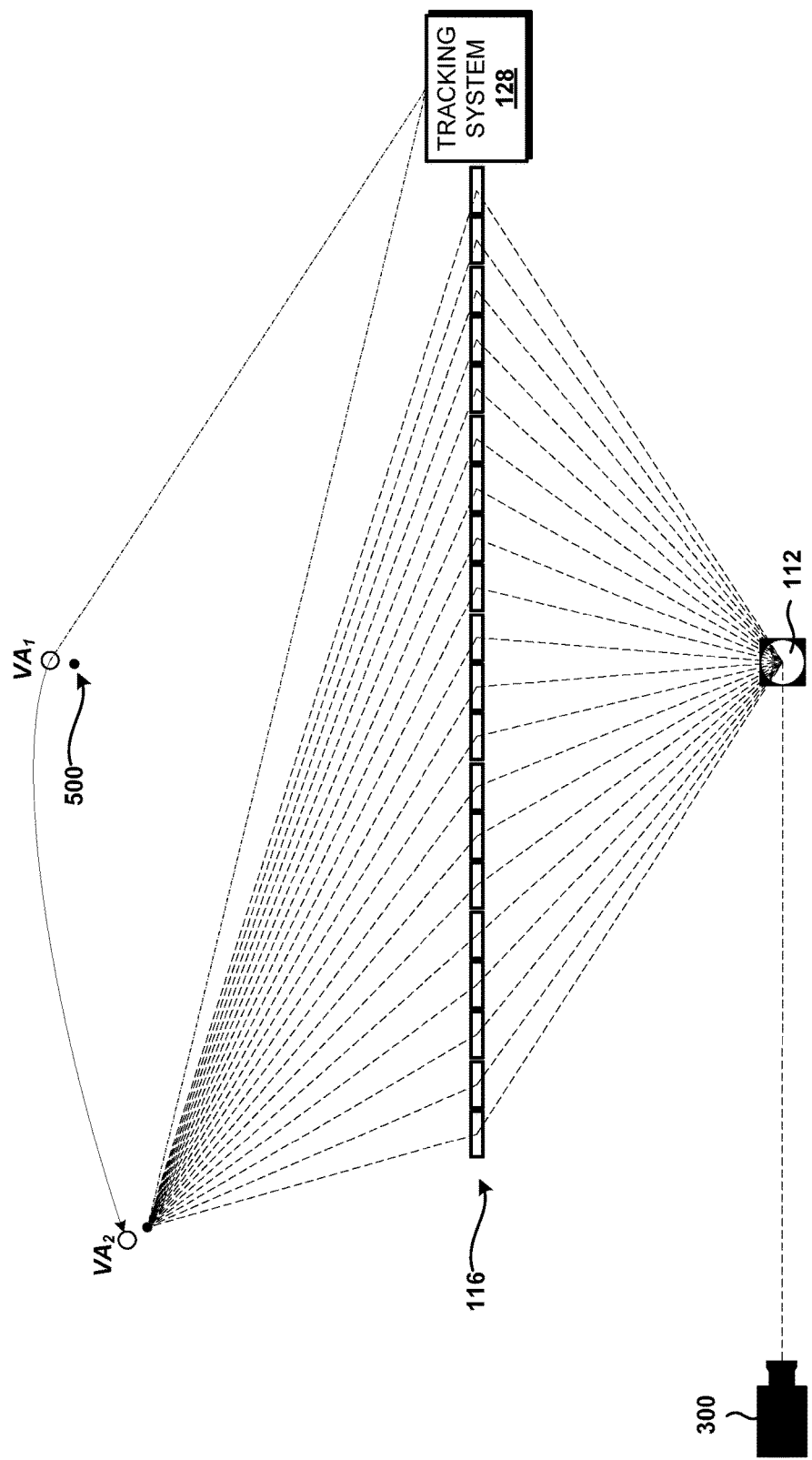
FIG. 5 is a line drawing illustrating an example of using the mirror array display system.

Turning now to FIG. 5, additional aspects of the mirror array display system 100 are described in additional detail, according to an illustrative embodiment. FIG. 5 is a line drawing illustrating additional aspects of the mirror array display system 100, arranged according to at least some embodiments presented herein. As shown in FIG. 5, a first viewing area VA$_1$ associated with the viewer 130 viewing the mirror array 116 at or near a first convergence point 500 can move with respect to the mirror array 116. As such, the viewer 130 viewing the mirror array 116 can move away from a first convergence point 500 located at or near the first viewing area VA$_1$ and therefore may be unable to see the image 126 created by the mirror array display system 100. According to various embodiments of the concepts and technologies disclosed herein, the mirror array display system 100 can be configured to recognize movement of the viewer 130 from a first viewing area VA$_1$ to a second viewing area VA$_2$.

In some embodiments, as explained above, the mirror array display system 100 can detect movement of the viewing areas and/or the viewer 130 by way of detecting movement of the viewer 130 and/or eyes, a body, appendages, or other entities associated with the viewer 130. In response to detecting movement of a viewer 130 from the first viewing area VA$_1$ to the second viewing area VA$_2$, the mirror array display system 100 can be configured to move a convergence point 500 of light 302 emitted by the mirror array display system 100 to a new convergence point 502 associated with and/or near the second viewing area VA$_2$.

As can be appreciated from the above description, the convergence point of the mirror array display system 100 can be moved, for example, by modifying orientations and/or positions of the steering mirror 112 and/or the mirrors 118. Thus, in addition to receiving the tracking data 132 generated by the tracking system 128, the controller 102 can be configured to use the tracking data 132 in conjunction with other considerations to generate the aiming parameters 122 and/or to modify aiming parameters 122 in response to detecting movement of the viewer 130. It should be understood that these embodiments are illustrative, and should not be construed as being limiting in any way. Convergence points can also be moved to change the displayed real images in response to viewer commands and/or gestures registered by the tracking system 128.

Figure 6A:
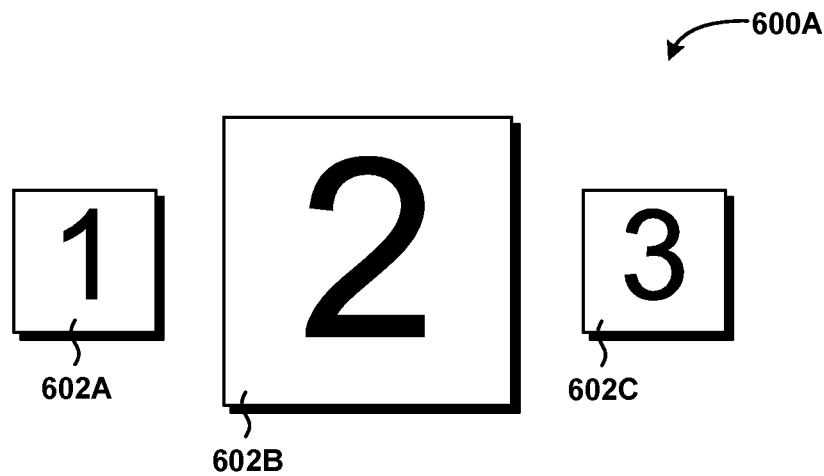
FIGS. 6A-6B are line drawings illustrating illustrative displays generated by the mirror array display system.
Figure 6B:
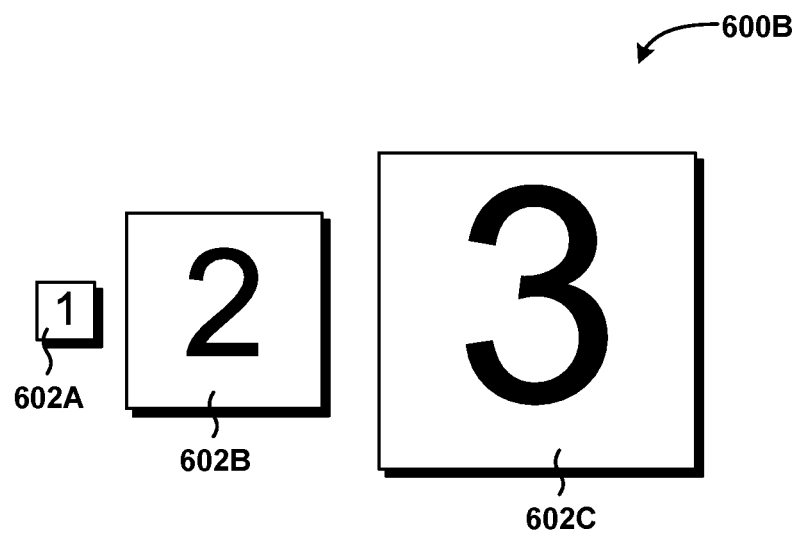

Referring now to FIG. 6A, an illustrative display 600A generated by the mirror array display system 100 is shown, according to an example embodiment. In particular, FIGS. 6A and 6B are line drawings illustrating illustrative displays generated by the mirror array display system, arranged according to at least some embodiments presented herein. It should be understood that the contents of the display 600A shown in FIG. 6A are illustrative, and that almost any type of content can be shown. The simplified display 600A is provided for purposes of illustrating and describing the concepts and technologies disclosed herein and should not be construed as being limiting in any way.

As shown in the display 600A, an image containing three squares 602A, 602B, 602C is shown. It can be appreciated from the description herein that the squares 602A, 602B, 602C can be projected by the mirror array display system 100 by modulating the light source 300, reflecting the modulated light 302 generated by modulating the light source 300 with a mirror such as the steering mirror 112 described above, and reflecting or directing reflected beams 304 with mirrors 118 to aim aimed beams 306 toward a convergence point such as the convergence point 308 shown in FIG. 3. With reference to FIGS. 3 and 6A, it can be appreciated that the display 600A shown in FIG. 6A can correspond to an example view at the convergence point 308 shown in FIG. 3.

Referring now to FIG. 6B, a display 600B generated by the mirror array display system 100 is shown, according to another example embodiment. In the example embodiment shown in FIG. 6B, the viewer 130 has moved, relative to the convergence point 308. While the mirror array display system 100 can be configured to detect such a movement (an example of which is shown in FIG. 5 and described above with reference thereto), some embodiments of the concepts and technologies disclosed herein include not modifying the aiming parameters 122 and/or the displayed image 126 in response to movement of a viewing area and/or a viewer 130. In such a case the real images 602A, 602B, and 602C of the displayed image 126 will appear to the viewer 130 as real objects that are fixed in space relative to the mirror array 116. For example, the middle object "2" might appear larger as shown in the drawing due to perspective, as with actual objects in space.

In embodiments of the mirror array display system 100 in which the image 126 is not modified in response to movement of the viewer 130, the image 126 displayed by the mirror array display system 100 may appear to move with the viewer 130. As such, in some embodiments, the viewer 130 making a movement such as the movement shown in FIG. 5 may see the display 600A at the first viewing area VA$_1$ and at the second viewing area VA$_2$. In such a case, because the displayed image 126 moves along with the viewer 130, the real images 602A, 602B, and 602C of the displayed image 126 might remain generally the same in appearance to the viewer 130. It should be understood that this embodiment is illustrative, and should not be construed as being limiting in any way.

In other embodiments, as explained herein in detail, the mirror array display system 100 can be configured not to modify the image 126 or the convergence point in response to detecting a movement of the viewer 130. As such, in some embodiments the viewer 130 making a movement such as the movement shown in FIG. 5 may see the display 600A shown in FIG. 6A at the first viewing area VA$_1$ and the display 600B shown in FIG. 6B at the second viewing area VA$_2$. It can be appreciated with reference to FIG. 6B that the viewer 130 moving relative to the convergence point may see a distorted image and/or a change in size or relative size as illustrated in FIG. 6B. This can allow a user such as the viewer 130 to see perspective, to effectively zoom into a displayed image 126 by moving closer to it, or to experience other optical effects that may or may not be desirable.

Figure 8A:
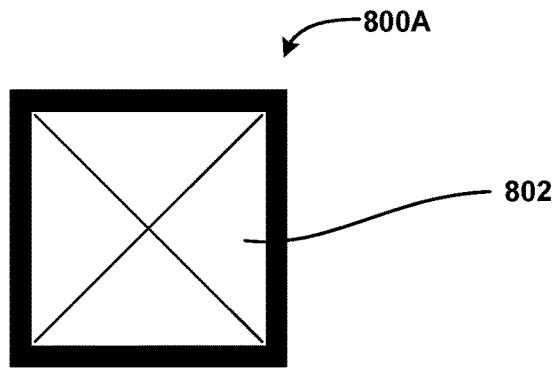
FIGS. 8A-8C are line drawings illustrating illustrative displays generated by the mirror array display system.
Figure 8B:
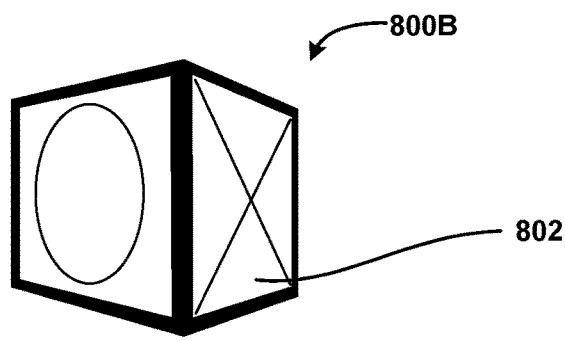
Figure 8C:
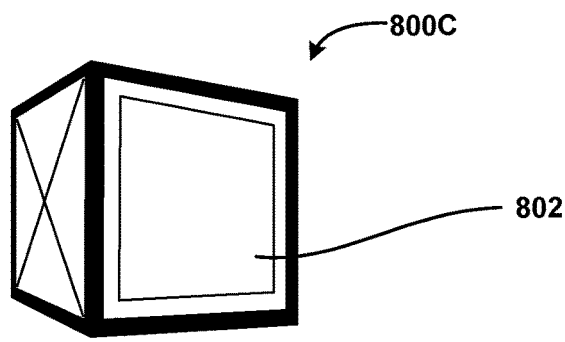

In one contemplated example, the mirror array display system 100 is used to create only one real image 126, one imaged object, and that object can be viewed from various angles. As such, more than one viewer 130 can see the image 126, or one viewer 130 can move with respect to the mirror array 116 and see the image 126 from different perspectives. In this example, the image 126 corresponds to a stationary actual object (which, however, can be moved by the controller 102 or by the viewer 130 acting through the tracking system 128). Different views of such an image 126 are illustrated in FIGS. 8A-8C. These various views can result from a viewer 130 moving around a real image 802 that is fixed in space, similar to when the viewer 130 moves about a real object (as mentioned above), or, independently of any viewer motion relative to the image 802 and/or the mirror array 116, from rotation of the image 802 in space by action of the display system 100 due to viewer commands or other reasons. In some embodiments, a single image 126 can be illuminated by all the mirrors 118 in the array 116, or by only a few, depending on the tracking system 128. In another contemplated example, one image 126 is provided for each of multiple viewers 130. The images 126 may or may not be moved in accordance with movements of the viewer(s) 130. In some embodiments, the controller 102 can split a single image 126 into two image components or sub-images (not shown), for example, if two different viewers 130 indicate, for example through the tracking system 128, that the image 126 is to move or evolve in different ways. One example is a single image 126 that is manipulated by two different viewers 130 at the same time, and therefore evolves differently for the two viewers 130. It should be understood that these embodiments are illustrative, and should not be construed as being limiting in any way.

As shown in the example shown in FIG. 6B, the squares 602A, 602B, 602C can be skewed with respect to the original dimensions shown in FIG. 6A. In light of the above description, it should be understood that this embodiment is illustrative, and should not be construed as being limiting in any way. It will be understood that the display system 100 in principle can be capable of presenting any sorts of images to any number of people and of evolving those images in any way whatsoever, because the displayed image 126 can be based on visual content 124 that is completely arbitrary. In other embodiments, movements of the viewer 130 can be captured by the mirror array display system 100 and the image 126 can be modified to provide the viewer 130 alternative views. An example of such embodiments is illustrated and described below with reference to FIGS. 7-8C.

Figure 7:
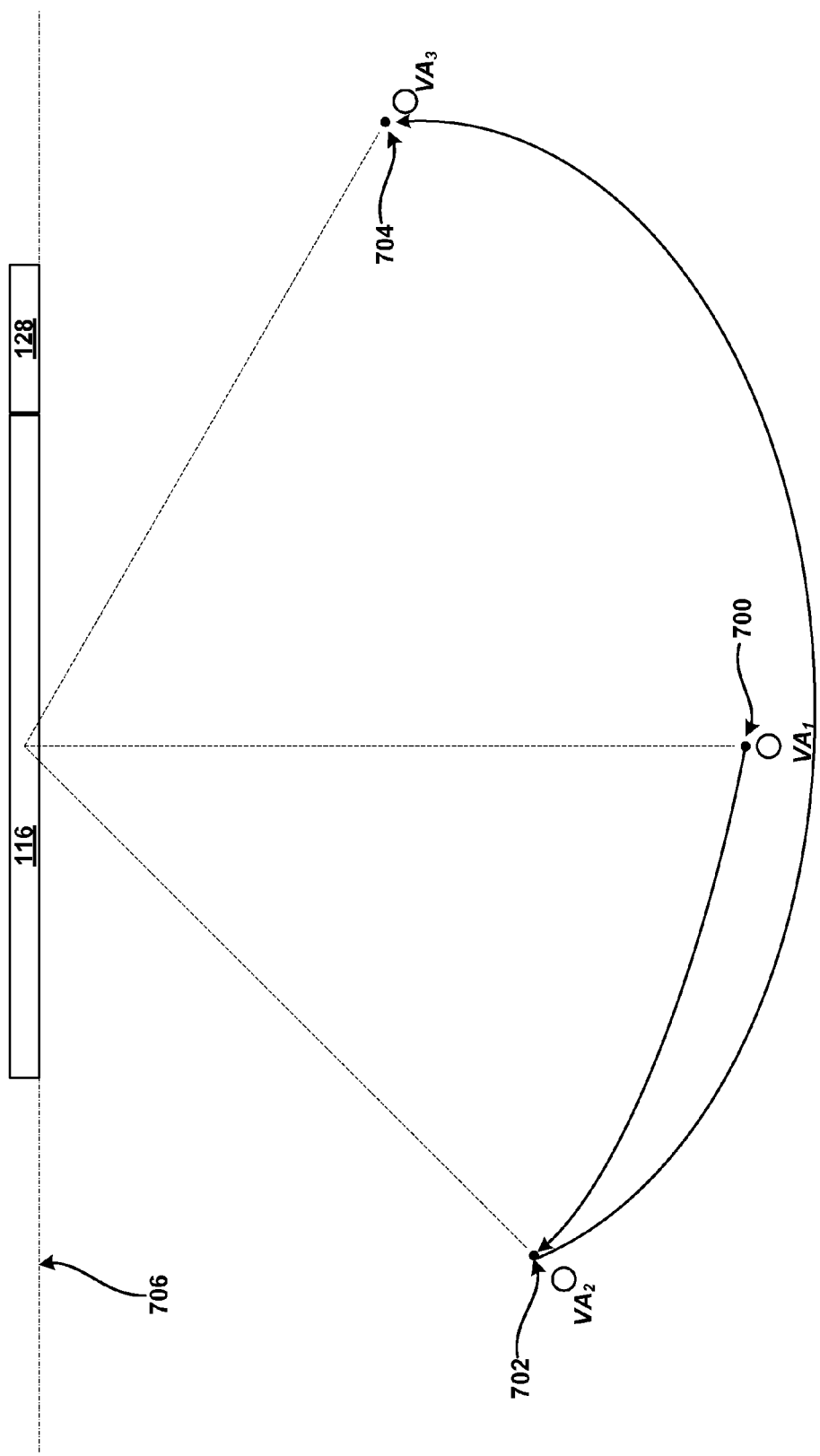
FIG. 7 is a line drawing illustrating another example of using the mirror array display system.

Turning now to FIG. 7, additional aspects of the mirror array display system 100 are described in additional detail, according to an illustrative embodiment. FIG. 7 is a line drawing illustrating another example of using the mirror array display system, arranged according to at least some embodiments presented herein. As shown in FIG. 7, the viewer 130 (not shown in FIG. 7) can move from a first viewing area $VA_1$ associated with the viewer 130 viewing the mirror array 116 at a first convergence point 700 to a second viewing area $VA_2$. In some embodiments, the functionality of the mirror array 116 can be provided by hardware included on a handheld or other portable device and the movement shown in FIG. 7 can be accomplished by rotating the mirror array 116 with respect to a static viewing area, the viewer, the Earth, or some other reference frame. That is, in contrast to the cases mentioned above, in which the (real) image 126 is fixed relative to the mirror array 116 (at least until moved by the mirror array display system 100), the image 126 can be fixed relative to the Earth or relative to the viewer 130, for example, with the controller 102 changing the aiming parameters 122 as the mirror array 116 moves, either by rotation or by translation through space, so as to keep the real image 126 immobile relative to the viewer 130, the Earth, or some other reference frame, regardless of the motions of the mirror array 116.

In such a mode, the viewer 130 can move the mirror array 116 in order to view different portions of an image 126 larger than what can be seen in front of the mirror array 116 (nothing will be seen outside the borders of the mirror array 116, because rays can come only from the mirror array 116). In other words, the mirror array 116 can effectively act in a similar manner to a window, allowing the viewer 130 to see images 126 either in front of the mirror array 116 or behind the mirror array 116. According to various embodiments, additional portions of the image 126 can be viewed or accessed by moving the image 126 out of the viewing area, for example, moving the borders of the mirror array 116 so as to bring the next portion of the image 126 into view. As such, the mirror array display system 100 can provide an experience similar to scrolling icons on a touchscreen, except that the icons can be fixed in space while the viewing area moves, creating an effect similar to that of moving a piece of transparent glass mounted in an opaque border over images stationary on a tabletop. As such, the example provided herein with respect to a moving viewer 130 is illustrative and should not be construed as being limiting in any way.

In response to detecting the movement of the viewer 130, or detecting movement of a device that includes the mirror array display system 100, the mirror array display system 100 can relocate a convergence point from near the first viewing area $VA_1$ to near the second viewing area $VA_2$. As such, a second convergence point 702 is shown in FIG. 7. In accordance with the various concepts and technologies disclosed herein, the image 126 shown at the first viewing area $VA_1$ and the second viewing area $VA_2$ can be identical. In other embodiments, as shown in FIGS. 8A-8C, the image 126 can be maintained in a stationary position in an interaction space and may or may not be modified in response to detecting movement of the mirror array display system 100, a device embodying the mirror array display system 100, or the viewer 130 using the mirror array display system 100.

In particular, FIGS. 8A-8C are line drawings illustrating illustrative displays generated by the mirror array display system 100, arranged according to at least some embodiments presented herein. The example display 800A shown in FIG. 8A can correspond to a view of the image 126 at the first view area $VA_1$. Similarly, the display 800B shown in FIG. 8B can correspond to a view of the image 126 at the second view area $VA_2$, and the display 800C shown in FIG. 8C can correspond to a view of the image 126 at the third view area $VA_3$. In the embodiments illustrated in FIGS. 8A-8C, the mirror array display system 100 can be configured to maintain the image 126 in a static position. As such, the viewer 130 can see different information and/or different aspects or angles of the image 126 at the various view areas $VA_1$, $VA_2$, $VA_3$. Similarly, although not shown in FIGS. 8A-8C, the viewer 130 can "zoom" into or out of the image 126 by moving toward, or away from, the image 126, respectively.

As explained above, the mirror array display system 100 can also be configured to modify the displayed image 126 in response to movement of the viewer 130 relative to the mirror array 116 and/or in response to movement of the mirror array 116 relative to the viewer 130. In one contemplated embodiment, the mirror array 116 is embodied in a handheld device and movement of the handheld device, relative to eyes of the viewer 130 or other viewing area, can be detected by the controller 102 via the tracking system 128 or other mechanisms. In response to detecting the movement, the controller 102 can modify the image 126 to shift the displayed image 126 out of a viewable space and to shift other content into the viewable space. Thus, devices with limited display space and/or space for supporting the mirror array 116 can be used to provide interactions with the image 126 as disclosed herein. It should be understood that this embodiment is illustrative, and should not be construed as being limiting in any way.

The mirror array display system 100 thus can be embodied in a handheld device and manipulated relative to eyes of the viewer 130, for example, or relative to space or the Earth, via rotation and/or translation to access alternative views of the image 126 or different portions of the image 126. Furthermore, the concepts and technologies disclosed herein shown in this simple example can be extended to allow viewers 130 to explore complex three dimensional structures, to provide various views of information, and/or for other purposes as described herein. It should be understood that these embodiments are illustrative, and should not be construed as being limiting in any way.

Turning now to FIG. 9, additional aspects of the mirror array display system 100 are described in additional detail, according to an illustrative embodiment. FIG. 9 is a line drawing illustrating additional aspects of the mirror array display system, arranged according to at least some embodiments presented herein. While the functionality of the tracking system 128 has been primarily discussed herein above with reference to embodiments in which the tracking system 128 tracks movement of the viewer 130, embodiments of the concepts and technologies disclosed herein include tracking systems 128 that additionally or alternatively track movements of viewer appendages, eyes, or other entities. An example of one embodiment for providing such a feature is illustrated and described with reference to FIG. 9.

As shown in FIG. 9, the viewer 130 is shown interacting with the mirror array display system 100. From the perspective of the viewer 130 at a viewing area VA within a divergence cone DC and beyond a convergence point CP, a real image 900 can be visible to the viewer 130. As can be appreciated from the description herein, the convergence point CP can correspond to a single image point on the real image 900. As such, it can be appreciated that the real image 900 can be formed by any number of convergence points CP, but typically hundreds, or thousands, or more, of convergence points CP, though only a single convergence point is illustrated and labeled for the sake of clarity. Furthermore, it should be understood that all convergence points CP of the real image 900 can exist between the mirror array 116 and the viewing area VA.

In the illustrated embodiment, the viewer 130 can move an arm 902 or other appendage to interact with the real image 900. For example, the viewer 130 may move the arm 902 in a swipe motion, a grab motion, a wave motion, a push motion, a pull motion, other motions, other gestures, combinations thereof, or the like. The tracking system 128 can be configured to recognize movements of the arm 902 or other appendages of the viewer 130 and to modify the image 126 in response to detecting these and/or other movements. Thus, the viewer 130 can interact with the mirror array display system 100 to navigate a computer desktop, to navigate menus, to view information, and/or to take other actions with respect to the image 126. It should be understood that these embodiments are illustrative, and should not be construed as being limiting in any way.

According to some embodiments of the concepts and technologies disclosed herein, interactions of the viewer 130 with the real image 900 can correspond to moving or selecting 3D icons. Using various cameras, capacitance sensors, or other technologies, the controller 102 can receive tracking data 132 for determining a position of a hand or the arm 902 of the viewer 130 in relation to the real image 900, and the controller 102 can manipulate the image 126 to reflect modifications made in response to tracked movements. In one embodiment, the controller 102 moves the real image 900 such that the arm 902 can be maintained out of "contact" with the real image 900. Thus, the viewer 130 can "push" the real image 900 up, down, sideways, forward, and/or back to achieve various options. Hand gestures can also be used to rotate, compress or expand a real image 900.

In some embodiments, for example, the real image 900 can be enlarged if brought forward by the viewer 130. Thus, the real image 900 can be viewed by the viewer 130 in additional detail relative to a position farther from the viewer 130. Similarly, if the viewer 130 pushes the real image 900 away, the controller 102 may reduce detail or brightness of real image 900. The tracking system 128 can also track rates of movement, and these rates can be used to alter input and/or output. For example, depending on a force, speed, or acceleration of the gesture, the real image 900 or other image 126 can be "thrown" to a desired location in the viewable space and/or can be thrown out of the viewable space. Similarly, opening and shutting a first can be tracked by the tracking system 128 and interpreted by the controller 102 to correspond, along with movement of the fists, to a command enlarge or rotate the real image 900, among other commands such as selecting an icon (corresponding to a mouse click).

In some embodiments, the mirror array display system 100 can include speakers and/or microphones for audio input and/or output. Thus, auditory signaling can be used to enter commands. In some embodiments, for example, the viewer 130 can generate auditory commands by snapping fingers, clapping hands, speaking, or the like. These and other auditory commands can be implemented by the controller 102. If these auditory commands and/or other movements are made in conjunction with one another, the controller 102 can implement additional and/or alternative commands. Furthermore, movements associated with some auditory commands such as clapping, snapping, or the like, can also be tracked and, if made in proximity to the real image 900, can prompt the controller 102 to implement additional and/or alternative commands or other actions. There are many possibilities for manipulation without any physical contact and as such, the above embodiments should be understood as being illustrative of the concepts and technologies disclosed herein, and should not be construed as being limiting in any way.

Turning now to FIG. 10, additional aspects of the mirror array display system 100 are described in additional detail, according to an illustrative embodiment. FIG. 10 is a line drawing illustrating additional aspects of the mirror array display system, arranged according to at least some embodiments presented herein. As shown in FIG. 10, two viewers 130A, 130B are shown as viewing the mirror array display system 100. The controller 102 can be configured to identify the two viewers 130A, 130B; to determine convergence points for the two or more viewers 130A, 130B; and to configure the aiming parameters 122 in accordance with the determined convergence points.

In some embodiments, the tracking system 128 can be configured to associate, automatically or manually, each of the viewers 130A, 130B with visual content 124. Furthermore, either, neither, or both of the viewers 130A, 130B can be registered with the tracking system 128 and/or associated with one or more instances of the visual content 124. As such, the two or more viewers 130A, 130B can view the same visual content 124 and/or two or more of the viewers 130A, 130B can view the same or different visual content 124.

Additionally, the tracking system 128 can be configured to independently track movements of the viewers 130A, 130B and/or movements of the viewers 130A, 130B using facial recognition technologies, motion tracking technologies, biometric technologies, cameras, pressure and/or other proximity sensors, voice recognition technologies, infrared and/or or other optical technologies, combinations thereof, or the like. As such, the convergence points associated with each of the viewers 130A, 130B can be modified in response to movements of the viewers 130A, 130B. It should be understood that these embodiments are illustrative, and should not be construed as being limiting in any way.

It can be appreciated from the description herein that the mirror array display system 100 can create the images 126 by aiming beams of light to each point of a real image (or from each point of a virtual image) from the mirrors 118 of the mirror array 116. As such, any number of people standing in a viewable space associated with the mirror array 116 may see the same object, though from different angles. If convergence cones associated with the objects are narrowed as described above, then each person may look at a different area on the mirror array 116 and many of the mirrors 118 can be configured to send rays to one person only. As such, embodiments of the mirror array display system 100 can support showing different images 126 to different viewers 130, who can interact with the interface independently of each other. The viewers 130 thus can be able to manipulate the objects they see, which can affect the displayed objects for that viewer 130. Thus, one mirror array 116 can support two or more viewers 130.

It should be noted that even with narrow convergence cones or even single rays to pupils of the viewers 130, areas on the mirror array 116 that correspond to the various objects seen by the various different viewers 130 may not always be disjoint. In some cases, the multiple objects may overlap depending on proximities of the objects and/or the viewers 130, as well as sizes and positions of the objects, and/or whether or not direction-of-gaze detection is used to reduce visual-field peripheral ray density. In some embodiments, images 126 displayed for two viewers 130 may be projected using one mirror 118 if the mirror 118 is able to quickly shift from displaying the image 126 for one viewer 130 to the image 126 for another viewer 130. This can be done within the time of persistence of vision, or, the images can be allowed to degrade slightly where there is mirror overlap.

Figure 11:
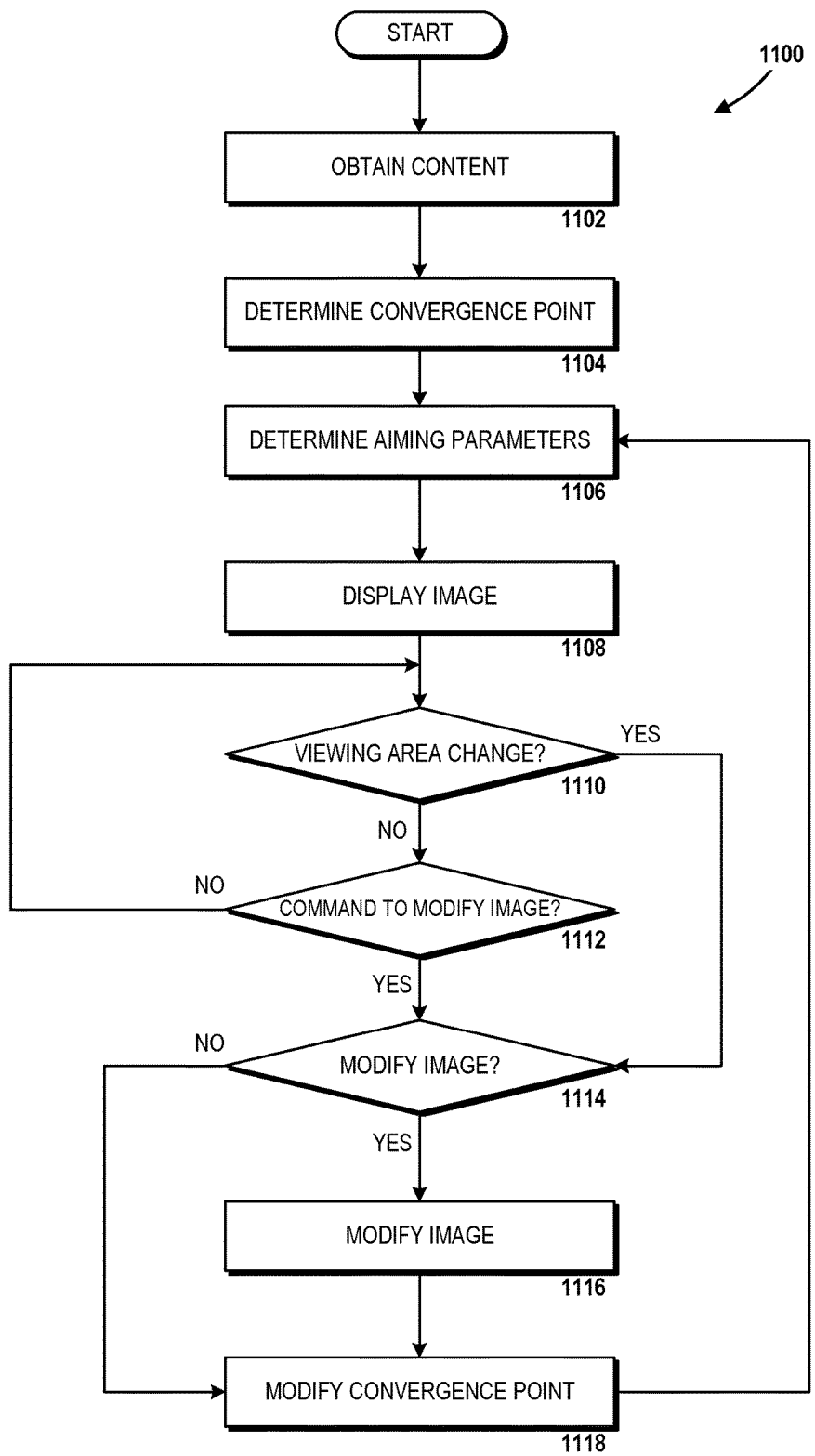
FIG. 11 is a flow diagram illustrating an example process for displaying content using a mirror array display system.

Turning now to FIG. 11, a flow diagram illustrating an example process 1100 for displaying content using a mirror array, arranged according to at least some embodiments presented herein, will be described. It should be understood that the operations of the processes described herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated processes can be ended at any time and need not be performed in its entirety. Some or all operations of the processes, and/or substantially equivalent operations, can be performed by execution of computer-readable instructions included on a computer storage media, as defined herein. The term "computer-readable instructions," and variants thereof, as used in the description and claims, is used expansively herein to include routines, applications, application modules, program modules, programs, components, data structures, algorithms, or the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, or the like.

For purposes of illustrating and describing the concepts of the present disclosure, the process 1100 is described as being performed by the controller 102. It should be understood that this embodiment is illustrative, and should not be viewed as being limiting in any way. Furthermore, as explained above with reference to FIG. 1, the controller 102 can execute one or more applications including, but not limited to, the aiming module 104 and/or the image control module 106 to provide the functionality described herein.

The process 1100 begins at operation 1102 (obtain content), wherein the controller 102 obtains visual content 124 from one or more sources of the visual content 124. As explained above, the visual content 124 can include animated content, static content, and/or combinations thereof. Furthermore, the visual content 124 can be obtained from any type of device or source associated with the visual content 124. Therefore, the controller 102 can obtain the visual content 124 via a transmission from a source, via a broadcast to any number of devices including the controller 102, and/or otherwise can obtain the visual content 124. As such, operation 1102 can include downloading or receiving the visual content 124, accessing one or more streams of data corresponding to the visual content 124, retrieving the visual content 124 from one or more types of media, and/or otherwise obtaining the visual content 124.

From operation 1102, the process 1100 proceeds to operation 1104 (determine convergence point), wherein the controller 102 determines a convergence point to which the visual content 124 received in operation 1102 is to be projected. It should be understood that in some embodiments, wherein the mirror array display system 100 is used to project virtual images, operation 1104 can include determining a divergence point for the virtual images in addition to, or instead of, determining a convergence point for real images. In some embodiments, the convergence point can be based upon a known or expected viewing area of the mirror array display system 100. For example, a viewing area, and therefore a convergence point, can be assumed to be at a particular distance, viewing angle, and/or other defined location relative to the mirror array display system 100. As explained and illustrated above, the convergence point may or may not coincide with a viewing area. Similarly, in some embodiments, the viewing area and/or the convergence point can be default settings that can be set by users, software controls, user settings, or the like. As such, operation 1104 can be skipped in some embodiments.

In other embodiments, the viewing area and/or the convergence point can be determined by the controller 102. For example, the controller 102 can access tracking data 132 obtained by the tracking system 128 or other systems or devices to determine a location of the viewer 130. In still other embodiments, viewers 130, users, or other entities can set a viewing area and/or convergence point associated with the mirror array display system 100. As such, operation 1104 can include obtaining input from users relating to viewing areas and/or convergence points. It should be understood that these embodiments are illustrative, and should not be construed as being limiting in any way.

From operation 1104, the process 1100 proceeds to operation 1106 (determine aiming parameters), wherein the controller 102 determines aiming parameters 122 for one or more light sources 300 and one or more mirrors such as, for example, the steering mirrors 112 and/or mirrors 118 of the mirror array 116. As explained above, the aiming parameters 122 can include parameters for specifying a modulation rate of the light sources 300 and an oscillation, rotation, or other movement rate associated with one or more of the steering mirrors 112 and/or mirrors 118. As such, the aiming parameters 122 can include various hardware control signals for controlling output associated with the mirror array display system 100.

From operation 1106, the process 1100 proceeds to operation 1108 (display image), wherein the controller 102 displays an image or images corresponding to the visual content 124 such as, for example, the image 126. According to various embodiments, the image 126 can be displayed via scanning modulated light pulses generated by the light source 300 across some, all, or none of the mirrors 118 of the mirror array 116 and aiming the light pulses to the viewer 130 at a convergence point to effectively "draw" the image 126 at the convergence point. Other embodiments are possible and are contemplated. As such, this embodiment should be understood as being illustrative and should not be construed as being limiting in any way.

From operation 1108, the process 1100 proceeds to operation 1110 (viewing area change?), wherein the controller 102 determines if a position, orientation, location, and/or other aspect of a viewing area has changed. For example, the operation 1110 can include obtaining, requesting, and/or receiving tracking data 132 from the tracking system 128. Thus, while not explicitly illustrated as an operation in FIG. 11, the controller 102 can analyze or monitor tracking data 132 to determine if the viewing area has changed.

If the controller 102 determines, in operation 1110, that the viewing area has not changed, the process 1100 can proceed to operation 1112 (command to modify image?), wherein the controller 102 determines if a command to modify the image 126 has been received or detected. As explained herein, the viewer 130 can interact with the image 126 by way of voice commands, hand gestures, interactions with input devices, keystrokes, and/or other mechanisms for entering a command for modifying the image 126. As such, the operation 1112 can include monitoring various devices or systems associated with the mirror array display system 100, requesting and/or analyzing tracking data 132 to determine if gestures or other movements for interacting with the image 126 have been received or obtained, or otherwise determining if input for modifying the image 126 has been received. A command to modify the image may also come from the display system 100. For example, the visual content 124 might change at intervals.

If the controller 102 determines, in operation 1112, that a command to modify the image 126 has not been received, the process 1100 can return to operation 1110, wherein the controller 102 again determines if the viewing area has changed. As such, execution of the process 1100 by the controller 102 can, but does not necessarily, pause at or reiterate operations 1110-1112 until a viewing area change is detected by the controller 102 in operation 1110 and/or until a command to modify the image 126 is detected or received in operation 1112.

If the controller 102 determines, in any iteration of operation 1110, that the viewing area has changed, the process 1100 proceeds to operation 1114 (modify image?), wherein the controller 102 determines if the image 126 is to be modified in response to the viewing area change detected in operation 1110. Similarly, the process 1100 can proceed to operation 1114 if the controller 102 determines, in any iteration of operation 1112, that a command to modify the image 126 has been received or detected. While FIG. 11 illustrates operations 1112 and 1114 as being executed in the alternative, it should be understood that this is not necessarily the case. Rather, in some embodiments, the controller 102 can determine that a viewing area has changed and that a command to modify the image 126 also has been received or detected. As such, the illustrated embodiment should be understood as being illustrative and should not be construed as being limiting in any way.

As explained above, the controller 102 can be configured to modify the image 126 in a number of ways. For example, the controller 102 can modify the image 126 by projecting the image 126 to a new viewing area associated with the viewer 130. Also, the controller 102 can modify the image 126 by modifying the projected image 126 in accordance with the command to modify the image 126 received in operation 1112. Thus, the controller 102 can modify the viewing area from which the image 126 is visible as well as, or instead of, modifying the content and/or position and/or orientation of the image 126. Because other modifications are possible and are contemplated, as disclosed herein, it should be understood that these embodiments are illustrative, and should not be construed as being limiting in any way.

If the controller 102 determines, in operation 1114, that the image 126 is to be modified, the process 1100 proceeds to operation 1116 (modify image), wherein the controller 102 modifies the displayed image 126 to project the image 126 toward a new viewing area and/or to include additional and/or alternative information. Various embodiments of modifying the image 126 are described herein and are therefore not repeated here.

From operation 1116, and/or from operation 1114 if the controller 102 determines in operation 1114 that the image 126 is not to be modified, the process 1100 proceeds to operation 1118 (modify convergence point). At operation 1118, the controller 102 can modify the convergence point in accordance with the viewing area change detected in operation 1110. Because the convergence point can be modified whether or not the image content is to be modified, it can be understood that the controller 102 can modify output of the mirror array display system 100 to project the image 126 to a new viewing area by modifying the convergence point of the image 126 while retaining the same information in the image 126. It, therefore, can be appreciated that in some embodiments, the functionality described with respect to operation 1118 can be omitted, as mentioned above.

From operation 1118, the process 1100 returns to operation 1106 (determine aiming parameters), wherein the controller 102 determines aiming parameters 122 based upon the modified convergence point and/or the modified image 126. As explained above with regard to operation 1118, the aiming parameters 122 can be modified to modify the image 126 or to project the same image 126 toward a new viewing area and/or associated convergence points. The process 1100 may repeat (e.g., periodically, continuously, or on-demand) or terminate at any time, as noted above.

Figure 12:
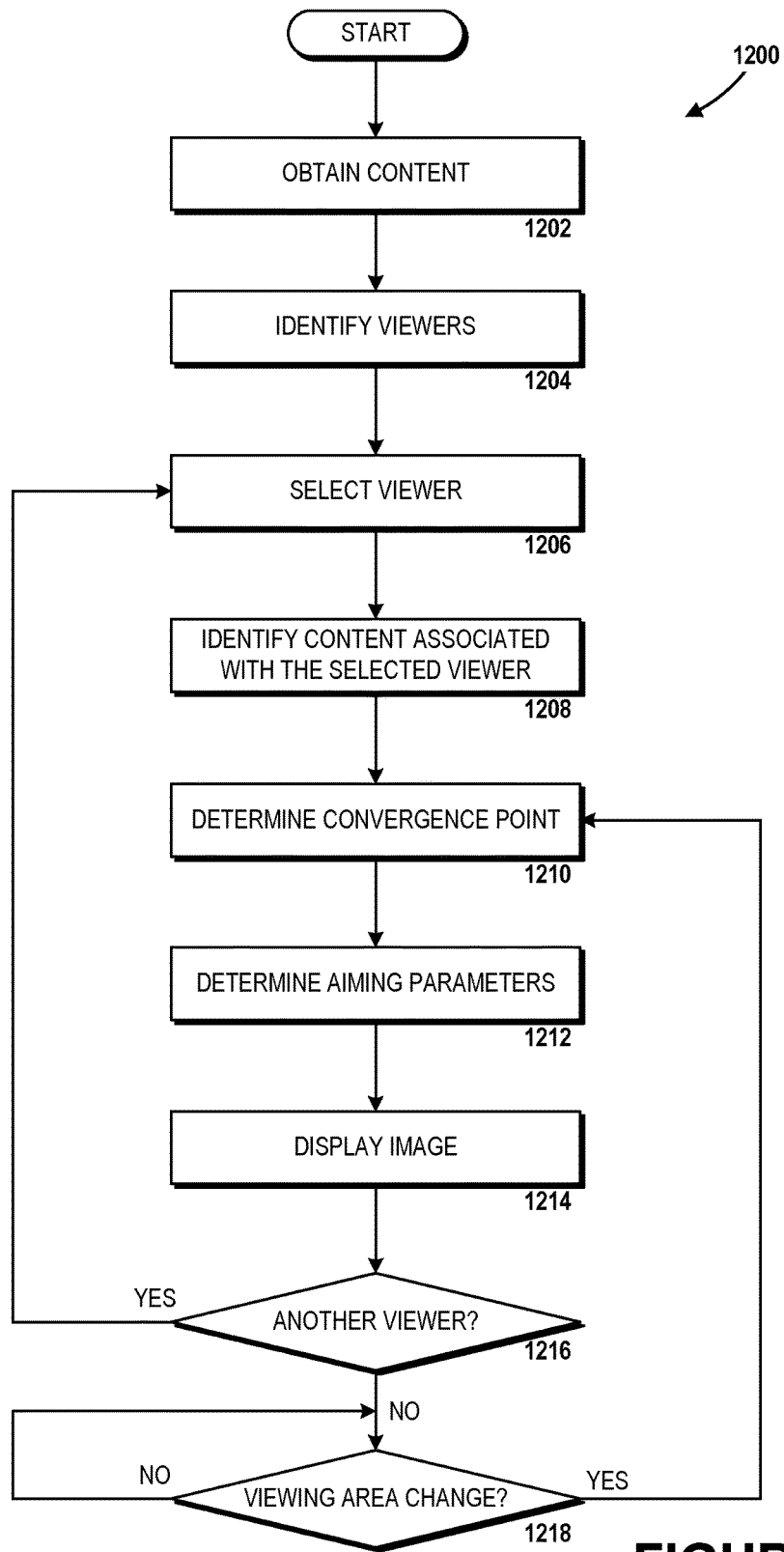
FIG. 12 is a flow diagram illustrating another example process for displaying content using the mirror array display system.

Turning now to FIG. 12, a flow diagram illustrating another example process 1200 for displaying content using a mirror array, arranged according to at least some embodiments presented herein, will be described. For purposes of illustrating and describing the concepts of the present disclosure, the process 1200 is described as being performed by the controller 102. It should be understood that this embodiment is illustrative, and should not be viewed as being limiting in any way. Furthermore, as explained above with reference to FIG. 1, the controller 102 can execute one or more applications including, but not limited to, the aiming module 104 and/or the image control module 106 to provide the functionality described herein.

The process 1200 begins at operation 1202 (obtain content), wherein the controller 102 obtains visual content 124 from one or more sources of the visual content 124. Generally speaking, the controller 102 can obtain the visual content 124 in operation 1202 in a manner substantially similar to the manner in which the visual content 124 is obtained in operation 1102 described above with reference to FIG. 11. In operation 1202, however, the controller 102 can obtain multiple instances of visual content 124, for example, a first instance of visual content 124 for the first viewer 130A and a second instance of visual content 124 for the second viewer 130B. Although multiple instances of visual content 124 can be obtained, the multiple instances of visual content 124 nonetheless can be identical.

From operation 1202, the process 1200 proceeds to operation 1204 (identify viewers), wherein the controller 102 identifies one or more viewers 130. As used herein, the term "identify" can refer to one or more of recognizing a person (or animal) as a user or potential user; recognizing a person as a particular individual; recognizing a person as a member, group, or type; or the like. As such, for example, the controller 102 can identify a person as John Smith of 123 Pantopia Way, Anytown; a woman; a young person; a person wearing a tie; or the like. With reference to the example shown in FIG. 10, the controller can identify the first viewer 130A and the second viewer 130B. It should be understood that this embodiment is illustrative, and should not be construed as being limiting in any way. According to various embodiments, the controller 102 identifies the viewers 130 based upon input received at the controller 102, based upon analysis such as facial or ocular recognition technologies, via other input or analysis, or the like.

From operation 1204, the process 1200 proceeds to operation 1206 (select viewer), wherein the controller 102 can select a viewer from the identified viewers 130. The controller 102 selects the viewer 130 for purposes of determining a convergence point, an identity of the viewer 130, visual content 124 associated with the viewer 130, or the like. As such, it should be understood that the choice as to which viewer 130 to configure first can be random, can be based upon user preferences, based upon software settings, or the like. Similarly, some embodiments of the mirror array display system 100 can be configured to contemporaneously configure multiple viewers 130 and as such, operation 1206 can be skipped, if desired. As such, the description herein of the process 1200, wherein the viewer 130 can be selected and configured, should be understood as being illustrative and should not be construed as being limiting in any way.

From operation 1206, the process 1200 proceeds to operation 1208 (identify content associated with the selected viewer), wherein the controller 102 identifies, from among the visual content 124 obtained in operation 1202, visual content 124 associated with the viewer selected in operation 1206. This identification can be set by a user, determined by the controller 102, for example, based upon an order in which viewers 130 are detected, or the like. In other embodiments, viewers 130 manually specify visual content 124 to be associated with the viewer 130. Regardless of how the association is made, the controller 102 can be configured to associate visual content with the viewer 130. In some cases, a viewer such as the viewer 130, on initially approaching the mirror array display system 100, can be presented with introductory content and/or can be invited to search or modify the content. The introductory content may be generic or may be customized for the individual identity, type, group, or other aspect of the viewer 130 as explained above.

From operation 1208, the process 1200 proceeds to operation 1210 (determine convergence point), wherein the controller 102 determines a convergence point to which the visual content 124 determined in operation 1208 is to be viewed by the associated viewer 130. Again, this determination can be made automatically by the controller 102 and/or based upon user input. Furthermore, the tracking system 128 can detect a face or eyes associated with the viewer 130 and determine an orientation, position, and/or range to the viewer 130 and determine the viewing area based upon these and/or other determinations. The convergence point can be determined based, at least partially, upon the viewing area.

Although not separately shown in FIG. 12, the process 1200 and/or the operation 1210 can include dedicating a portion of the mirror array 116 to a viewer 130. As such, a first portion of the mirror array 116 can be controlled by the controller 102 to provide visual content 124 to the first viewer 130 and a second portion of the mirror array 116 can be controlled by the controller 102 to provide visual content 124 to the second viewer 130. As noted above with reference to FIG. 11, determination of the convergence point for each viewer 130 can be completed automatically and/or based upon input received at the controller 102.

From operation 1210, the process 1200 proceeds to operation 1212 (determine aiming parameters), wherein the controller 102 determines aiming parameters 122. As explained above, the aiming parameters 122 can include hardware or software signaling or instructions for controlling one or more light sources 300 such as the laser 110. Additionally, or alternatively, the aiming parameters 122 can include hardware or software signaling or instructions for controlling one or more mirrors such as, for example, the steering mirror 112 and/or the mirrors 118 of the mirror array 116 via control of one or more motors such as, for example, and the steering mirror motor 114 and/or the motors 120. It should be understood that these embodiments are illustrative, and should not be construed as being limiting in any way.

From operation 1212, the process 1200 proceeds to operation 1214 (display image), wherein the controller 102 displays an image or images, for example, the image 126, which can correspond to visual content 124 identified in operation 1208. From operation 1214, the process 1200 proceeds to operation 1216 (another viewer?), wherein the controller 102 determines if another viewer 130 is to be configured. If the controller 102 determines that another viewer 130 is to be configured, the process 1200 returns to operation 1206, wherein the controller 102 selects another viewer 130 to configure and the operations 1208-1216 can be repeated.

If the controller 102 determines, in operation 1216, that another viewer is not to be configured, the process 1200 proceeds to operation 1218 (viewing area change?), wherein the controller 102 determines if a position, orientation, location, and/or other aspect of a viewing area associated with one or more of the viewers 130 identified in operation 1204 has changed. For example, the operation 1210 can include obtaining, requesting, and/or receiving tracking data 132 from the tracking system 128. Thus, while not explicitly illustrated as an operation in FIG. 12, the controller 102 can analyze or monitor tracking data 132 to determine if the viewing area has changed.

If the controller 102 determines, in operation 1218 that the viewing area has not changed, the process 1200 can return to operation 1218, wherein the controller 102 again determines if the viewing area associated with any of the viewers 130 identified in operation 1204 has changed. As such, execution of the process 1200 by the controller 102 can, but does not necessarily, pause at or reiterate operation 1218 until a viewing area change is detected by the controller 102. Although not illustrated in FIG. 12, the controller 102 also can determine if a command to modify the image 126 has been received or detected, as explained above with regard to FIG. 11. If the controller 102 determines, in any iteration of operation 1218, that a viewing area associated with the viewer 130 has changed, the process 1200 can return to operation 1210 (determine convergence point), wherein the controller 102 determines a convergence point based upon a changed viewing area. Although not shown in FIG. 12, if the controller 102 determines, in any iteration of operation 1218 or another operation, that a command to modify the image 126 has been received or detected, the process 1200 can return to operation 1212 (determine aiming parameters), wherein the controller 102 can determine aiming parameters 122 for the modified image 126. The process 1200 may repeat (e.g., periodically, continuously, or on-demand) or terminate at any time, as noted above.

As described herein, the mirror array display system 100 can provide a 3D display. A 3D display can be used, in some embodiments, to allow the viewers 130 to interact in free space with floating signs, icons, menus, and/or other information and/or objects. As such, embodiments of the concepts and technologies disclosed herein can be used to enable rich interactions with these and other objects and/or can reduce chances that multiple viewers will crowd each other. In some embodiments, viewers 130 can move icons in space and place them in new positions corresponding to new classifications, deletions, selections, or other actions.

As such, icons, rather than being on a flat surface of a screen display, can be located in free space, located on a 3D rotatable cylindrical surface in free space, or located on other entities in free space. Similarly, the icons can also be rotatable and thus may have multiple actions or associations accessible by rotating the icons. The viewers 130 may designate icons by gestures, finger snaps, or voice commands. Menu trees in three-dimensions may include more branches than 2D counterparts and may be easy to navigate. Similarly, menu trees also may be configured to rotate about one axis or more than one axis. Objects of interest to a viewer 130 can be drawn as being "located" closer to the viewer 130 to allow the viewer 130 to see and/or manipulate the object while objects not of interest to the viewer 130 can be pushed aside, away, or out of a displayable space. An object may be expanded or compressed by hand gestures to show more or less detail. The virtual mass and friction of laterally-moving touch-screen icons can also be incorporated into the icons.

In another embodiment, the mirror array display system 100 can be used to visualize 3D objects, because the convergence points CP of a real image are not opaque, as are the points on a corresponding real image; that is, the viewer 130 can see each image point but can also see what is behind it. Just as a sphere made of Christmas tree lights is largely transparent, so the real images made by the display system 100 can be transparent. The display system 100 might project, for example, a series of parallel plane images, one behind the other, and the viewer 130 would be able to see all of them. More complicated real objects can also be projected. For example, an engine such as an automobile engine can be explored using the mirror array display system 100. With the mirror array display system 100, the viewer 130 can command that the real-image engine rotate in space, have its parts move as when running, and so on. The viewer 130 might also be able to indicate a cut or slice of the engine to view separately. Any manipulation of the image is possible. With a 2D display, cross sections and perspective cutaway views are possible, but these are once removed from the real geometry. A transparent 3D engine may be easier for a viewer to understand than a series of 2D pictures. These and other interactions with 3D objects all can occur without using any sort of special gear. Thus, the mirror array display system 100 can be used for public displays, large or small.

As such, embodiments of the mirror array display system 100 can be used to provide an interactive, immersive, 3D display to viewers 130 without glasses, headgear, or other special gear. Thus, embodiments of the concepts and technologies disclosed herein can be located in airports, malls, and other places where people arrive without 3D gear. Additionally, as shown above in FIG. 10, embodiments of the mirror array display system 100 may be used by a group of viewers 130 at a particular time. Because the viewers 130 may have varied interests, and as such may want to view varied types of content, the mirror array display system 100 can support multiple independent viewers 130.

Embodiments of the concepts and technologies disclosed herein can be used to realize various benefits over existing display systems. For example, embodiments of the concepts and technologies disclosed herein can allow the display of more information than traditional displays because there can be more room for images and icons, relative to other display systems. Embodiments of the concepts and technologies disclosed herein also can allow use of more gestures than may be possible with other input devices. Embodiments of the mirror array display system 100 can be focus free, can have a long depth of view, and can operate in low light and/or bright light conditions by varying output power of the laser 110. Various embodiments can be used to provide 3D icons and menus that do not require high image quality and/or high image quality with good resolution, or, the mirrors 118 can be made small enough and close enough to provide high resolution images, or various portions of larger mirrors 118 can be individually used as discussed above to provide high resolution.

Various embodiments can also provide high energy efficiency. While light from traditional displays may emanate indiscriminately and may be almost entirely wasted since only a tiny fraction enters pupils of the viewers 130, embodiments of the concepts and technologies disclosed herein can target the light directly at pupils of the viewer 130, thereby reducing or even eliminating wasted energy. Thus, embodiments of the mirror array display system 100 can be incorporated in battery-powered devices. Embodiments of the concepts and technologies disclosed herein can also be used to improve and/or simplify cameras, which may often use traditional viewfinders and shutter mirrors since use of the concepts and technologies disclosed herein may result in saving energy that may be drained by 2D displays displaying similar or comparable imagery. Embodiments of the concepts and technologies disclosed herein can also be used to improve image quality, relative to other display technologies, due to the high brightness and the Helmholtz-Kohlrausch effect mentioned above, which can be used to provide rich colors from three highly monochromatic lasers. Similarly, the mirror array 116 can be shaped or configured in any shape and need not be planar. As such, embodiments of the mirror array 116 can be curved, e.g., around a room or a curved wall. Thus, a viewer 130 can be surrounded by images 126 that move along with the viewer 130, thereby providing a sense of immersion.

In some embodiments, the functionality of the mirrors 118 can be provided by mirrors that can be oriented and/or driven according to electrical driving signals. These mirrors 118 can be similar, in some embodiments, to some mirrors that may be used in various projection systems. For example, some projection systems can reflect laser beams off of a mirror, wherein the laser beam the instantaneous position of the mirror can be coordinated to project the desired image onto a surface for viewing. Three differently-colored lasers also can be used concurrently to project a full-color image. Thus, some embodiments of the concepts and technologies disclosed herein can include an array of projector systems that are used in accordance with various calculations for determining coordinates of the points of a desired three-dimensional real image from the position of the projector systems. This appearance, when suitably encoded in instructions, can be used as the driving signal for the projector system and as such, can correspond to the aiming parameters 122 disclosed herein.

Furthermore, while the various embodiments of the concepts and technologies disclosed herein have been described as including shining a laser beam into eyes of a viewer 130, albeit for brief intervals of time, it should be understood that such embodiments are generally not believed to be harmful to viewers. In particular, various embodiments use a laser 110 with a low duty ratio. Thus, the brief flashes of the laser beam can be safe for the viewer 130. Furthermore, while the various images 126 projected by the mirror array display system 100 may be transparent, the mirror array 116 behind the image 126 can be featureless and therefore generally will not distract the viewer 130. The mirrors 118 can, in their resting position, show the viewer 130 a portion of a bland surface, such as a black or gray surface.

Figure 13:
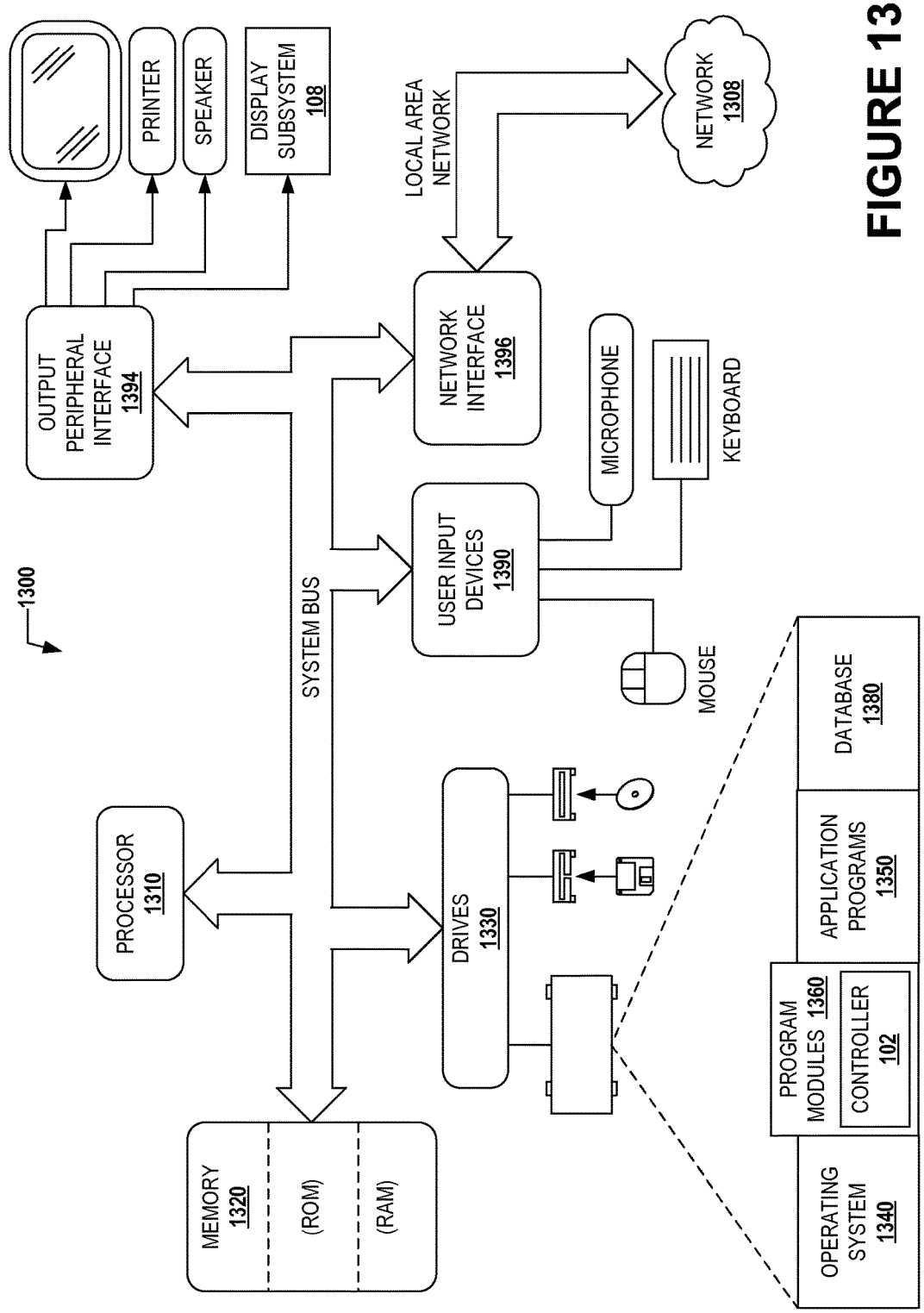
FIG. 13 is a block diagram illustrating an example computer capable of displaying content using a mirror array display system.

FIG. 13 is a block diagram illustrating an example computer 1300 capable of displaying content using a mirror array display system arranged according to at least some embodiments presented herein. As depicted, the computer 1300 includes a processor 1310, a memory 1320 and one or more drives 1330. The computer 1300 may be implemented as a conventional computer system, an embedded control computer, a laptop, or a server computer, a mobile device, an STB, a kiosk, a vehicular information system, a mobile telephone, a customized machine, or other hardware platform.

The drives 1330 and their associated computer storage media, provide storage of computer readable instructions, data structures, program modules and other data for the computer 1300. The drives 1330 can include an operating system 1340, application programs 1350, program modules 1360, and a database 1380. The program modules 1360 may include a controller, such as the controller 102. The controller 102 may be adapted to execute either or both of the processes 1100 and/or 1200 for displaying content using a mirror array as described in greater detail above (e.g., see previous description with respect to one or more of FIGS. 1-12). The computer 1300 further includes user input devices 1390 through which a user may enter commands and data. The user input devices 1390 can include one or more of an electronic digitizer, a microphone, a keyboard and pointing device, commonly referred to as a mouse, trackball or touch pad. Other input devices may include a joystick, game pad, satellite dish, scanner, other devices, or the like. In some embodiments, the other input devices include the mirror array display system 100, as users can input data or choices by manipulating real images produced by the mirror array 116 as described above.

These and other input devices can be coupled to the processor 1310 through a user input interface that is coupled to a system bus, but may be coupled by other interface and bus structures, such as a parallel port, game port or a universal serial bus ("USB"). Computers such as the computer 1300 also may include other peripheral output devices such as speakers, printers, displays, mirror array display systems 100, and/or other devices, which may be coupled through an output peripheral interface 1394 or the like. In some embodiments, the output peripheral interface 1394 can include the mirror array display system 100.

The computer 1300 may operate in a networked environment using logical connections to one or more computers, such as a remote computer (not illustrated), a mirror array display system 100, and/or other devices operating as part of or in communication with a network 1308 coupled to a network interface 1396. The remote computer may be a personal computer, a server, a router, a network PC, a peer device or other common network node, and can include many or all of the elements described above relative to the computer 1300. Networking environments are commonplace in offices, enterprise-wide area networks ("WAN"), local area networks ("LAN"), intranets, and the Internet.

When used in a LAN or WLAN networking environment, the computer 1300 may be coupled to the LAN through the network interface 1396 or an adapter. When used in a WAN networking environment, the computer 1300 typically includes a modem or other means for establishing communications over the WAN, such as the Internet or the network 1308. The WAN may include the Internet, the illustrated network 1308, various other networks, or any combination thereof. It will be appreciated that other mechanisms of establishing a communication link, ring, mesh, bus, cloud, or network between the computers may be used.

According to some embodiments, the computer 1300 may be coupled to a networking environment. The computer 1300 may include one or more instances of a physical computer-readable storage medium or media associated with the drives 1330 or other storage devices. The system bus may enable the processor 1310 to read code and/or data to/from the computer storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 1320, whether characterized as RAM, ROM, flash, or other types of volatile or nonvolatile memory technology. The media may also represent secondary storage, whether implemented as the storage drives 1330 or otherwise. Hard drive implementations may be characterized as solid state, or may include rotating media storing magnetically-encoded information.

The storage media may include one or more program modules 1360. The program modules 1360 may include software instructions that, when loaded into the processor 1310 and executed, transform a general-purpose computing system into a special-purpose computing system. As detailed throughout this description, the program modules 1360 may provide various tools or techniques by which the computer 1300 may participate within the overall systems or operating environments using the components, logic flows, and/or data structures discussed herein.

The processor 1310 may be constructed from any number of transistors or other circuit elements, which may individually or collectively assume any number of states. More specifically, the processor 1310 may operate as a state machine or finite-state machine. Such a machine may be transformed to a second machine, or specific machine by loading executable instructions contained within the program modules 1360. These computer-executable instructions may transform the processor 1310 by specifying how the processor 1310 transitions between states, thereby transforming the transistors or other circuit elements constituting the processor 1310 from a first machine to a second machine. The states of either machine may also be transformed by receiving input from the one or more user input devices 1390, the network interface 1396, other peripherals, other interfaces, or one or more users or other actors. Either machine may also transform states, or various physical characteristics of various output devices such as printers, speakers, video displays, or otherwise.

Encoding the program modules 1360 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, or the like. For example, if the storage media are implemented as semiconductor-based memory, the program modules 1360 may transform the physical state of the semiconductor memory 1320 when the software is encoded therein. For example, the software may transform the state of transistors, capacitors, or other discrete circuit elements constituting the semiconductor memory 1320.

As another example, the storage media may be implemented using magnetic or optical technology such as drives 1330. In such implementations, the program modules 1360 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description. As used in the claims, the phrase "computer storage medium," and variations thereof, does not include waves, signals, and/or other transitory and/or intangible communication media, per se.

Figure 14:
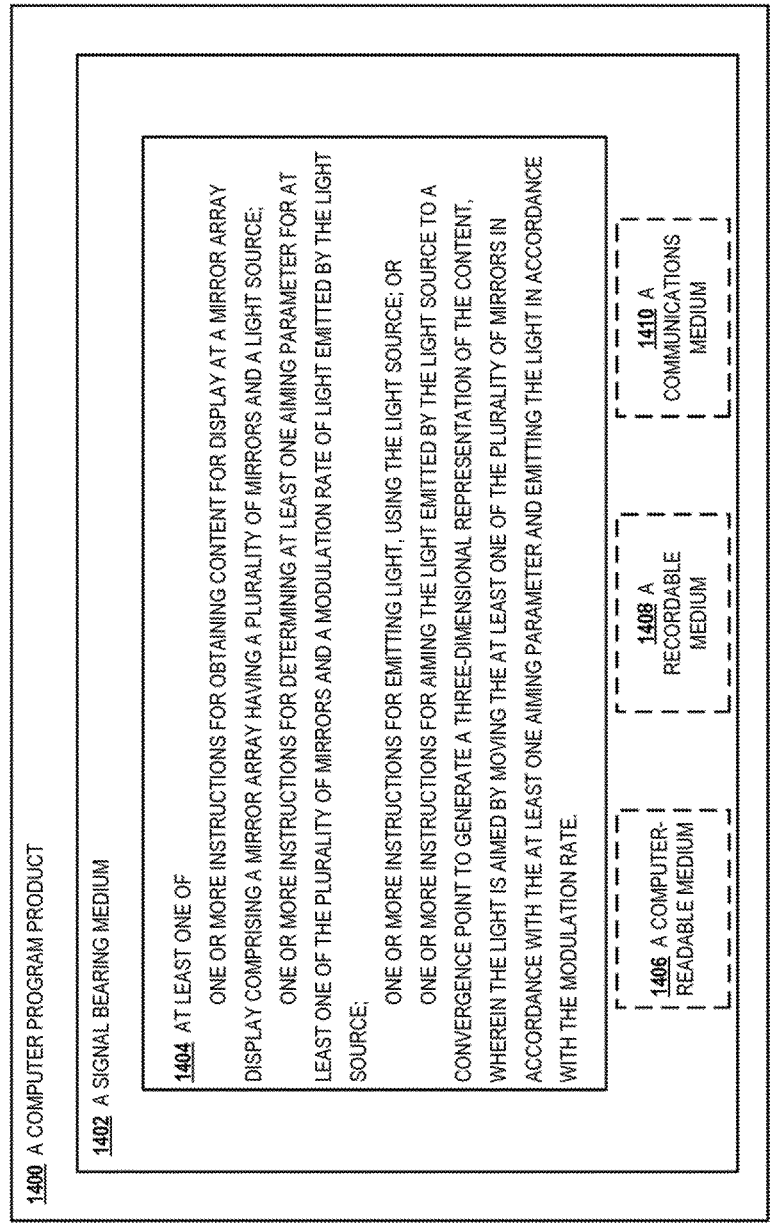
FIG. 14 is a schematic diagram illustrating computer program products for displaying content using a mirror array display system, all arranged according to at least some embodiments presented herein.

FIG. 14 is a schematic diagram illustrating computer program products 1400 for displaying visual content using a mirror array display system arranged according to at least some embodiments presented herein. An illustrative embodiment of the example computer program product 1400 is provided using a signal bearing medium 1402, and may include at least one instruction 1404. The at least one instruction 1404 may include: one or more instructions for obtaining content for display at a mirror array display comprising a mirror array having a plurality of mirrors and a light source; one or more instructions for determining at least one aiming parameter for at least one of the plurality of mirrors and a modulation rate of light emitted by the light source; one or more instructions for emitting light, using the light source; or one or more instructions for aiming the light emitted by the light source to a convergence point to generate a three-dimensional representation of the content, wherein the light is aimed by moving the at least one of the plurality of mirrors in accordance with the at least one aiming parameter and emitting the light in accordance with the modulation rate. In some embodiments, the signal bearing medium 1402 of the one or more computer program products 1400 include a computer readable medium 1406, a recordable medium 1408, and/or a communications medium 1410.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, or the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, compounds, or compositions, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc."

is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," or the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A computer-implemented method to display content by use of a mirror array display that comprises a controller, a mirror array that includes a plurality of mirrors, a tracking system, and a light source, the computer-implemented method comprising:
    obtaining, by the controller, the content;
    obtaining, by the controller, tracking data from the tracking system;
    determining, by the controller, at least one aiming parameter associated with the plurality of mirrors and the light source, wherein determining the at least one aiming parameter comprises determining the at least one aiming parameter based at least in part on the tracking data,
        wherein determining the at least one aiming parameter further comprises executing, based at least partially upon a convergence point, an aiming algorithm by the controller,
        wherein executing the aiming algorithm comprises determining a viewer's position relative to the convergence point, and wherein the viewer's position facilitates projection of a three-dimensional representation of the content;
    emitting light, using the light source; and
    aiming the light emitted by the light source to the convergence point to generate the three-dimensional representation of the content, wherein the light is aimed in accordance with the at least one aiming parameter.

2. The method of claim 1, wherein the convergence point comprises a first convergence point and a second convergence point, and wherein the content comprises a first content component visible at the first convergence point and a second content component visible at the second convergence point.

3. The method of claim 2, further comprising:
    determining, using the tracking data, a first location, relative to the mirror array display, of a first viewer;
    determining, using the tracking data, a second location, relative to the mirror array display, of a second viewer;
    determining the first convergence point based, at least partially, upon the first location; and
    determining the second convergence point based, at least partially, upon the second location.

4. The method of claim 3, wherein aiming the light comprises aiming a first portion of the light emitted by the light source to the first convergence point and aiming a second portion of the light emitted by the light source to the second convergence point.

5. The method of claim 1, wherein determining the at least one aiming parameter comprises determining, using the aiming algorithm, a modulation rate for the light source and a rotation angle, relative to the light source, of at least one of the plurality of mirrors.

6. The method of claim 1, wherein the light source comprises a laser, and wherein determining the at least one aiming parameter comprises determining, using the aiming algorithm, a modulation rate of a laser beam emitted by the laser and a rotation angle, relative to the light source, of at least one of the plurality of mirrors.

7. The method of claim 6, wherein the mirror array display further comprises a secondary mirror to aim the laser beam emitted by the laser, and wherein determining the at least one aiming parameter further comprises determining a rotation angle, relative to the light source, of the secondary mirror.

8. The method of claim 1, further comprising:
    determining, using the tracking system, a location, relative to the mirror array display, of the viewer; and
    determining the convergence point based, at least partially, upon the location of the viewer.

9. The method of claim 8, further comprising:
    determining that the viewer has moved relative to the convergence point;
    in response to determining that the viewer has moved, determining at least one modified aiming parameter and a modified convergence point; and
    aiming the light emitted by the light source to the modified convergence point, wherein the light is aimed to the modified convergence point in accordance with the at least one modified aiming parameter.

10. The method of claim 1, further comprising:
    determining, using the tracking system, a location, relative to the mirror array display, of a viewing area;
    determining the convergence point based, at least partially, upon the location of the viewing area;
    determining that the viewing area has moved relative to the convergence point; and in response to determining that the viewing area has moved:
   determining a rotation angle, relative to a rotation axis associated with the mirror array display, of a movement of the viewing area;
   modifying the content in accordance with the rotation angle to obtain modified content;
   determining a modified convergence point, in accordance with the rotation angle; and
   aiming the light emitted by the light source to the modified convergence point.

11. The method of claim 1, further comprising detecting, with the tracking system in communication with the controller, a movement of a user that corresponds to an interaction with the three-dimensional representation.

12. The method of claim 11, further comprising modifying the content in response to the interaction.

13. A non-transitory computer readable medium comprising computer executable instructions that, in response to execution by a computer, cause the computer to perform or cause to be performed:
   obtain content for display at a mirror array display that comprises a mirror array having a plurality of mirrors and a light source;
   obtain tracking data from a tracking system;
   determine, based at least in part on the tracking data, at least one aiming parameter for at least one of the plurality of mirrors and a modulation rate of light emitted by the light source,
      wherein the determination of the at least one aiming parameter comprises execution of, based at least partially upon a convergence point, an aiming algorithm,
      wherein the execution of the aiming algorithm comprises determination of a viewer's position relative to the convergence point, and wherein the viewer's position facilitates projection of a three-dimensional representation of the content;
   emit light by use of the light source; and
   aim the light emitted by the light source to the convergence point to generate the three-dimensional representation of the content, wherein the light is aimed by movement of the at least one of the plurality of mirrors in accordance with the at least one aiming parameter and the emission of the light in accordance with the modulation rate.

14. The non-transitory computer readable medium of claim 13, further comprising computer executable instructions that, in response to execution by the computer, cause the computer to perform or cause to be performed:
   determine, using the tracking data, a location, relative to the mirror array display, of a viewing area associated with the viewer; and
   determine the convergence point based, at least partially, upon the location of the viewing area.

15. The non-transitory computer readable medium of claim 14, further comprising computer executable instructions that, in response to execution by the computer, cause the computer to perform or cause to be performed:
   determine that the viewer has moved relative to the convergence point;
   after the determination that the viewer has moved, determine at least one modified aiming parameter and a modified convergence point; and
   aim the light emitted by the light source to the modified convergence point, wherein the light is aimed to the modified convergence point in accordance with the at least one modified aiming parameter.

16. The non-transitory computer readable medium of claim 14, further comprising computer executable instructions that, in response to execution by the computer, cause the computer to perform or cause to be performed:
   determine that the viewing area has moved relative to the convergence point; and
   after the determination that the viewing area has moved:
      determine a rotation angle, relative to a rotation axis associated with the mirror array display, of a movement of the viewing area;
      modify the content in accordance with the rotation angle to obtain modified content;
      determine a modified convergence point, in accordance with the rotation angle; and
      aim the light emitted by the light source to the modified convergence point.

17. The non-transitory computer readable medium of claim 16, wherein to determine the rotation angle, the computer executable instructions, in response to execution by the computer, cause the computer to perform or cause to be performed:
   determine a rotation point associated with the mirror array display;
   track movement, using the tracking system, of the viewing area relative to the rotation point; and
   calculate the rotation angle based, at least partially, on the movement of the viewing area relative to the rotation point.

18. The non-transitory computer readable medium of claim 16, wherein the tracking system comprises an image capture device to track movement of the viewer.

19. The non-transitory computer readable medium of claim 16, wherein the tracking system comprises an orientation sensor of a device, and wherein to determine the rotation angle, the computer executable instructions, in response to execution by the computer, cause the computer to perform or cause to be performed:
   determine, by use of the orientation sensor:
      a rotation point associated with the mirror array display,
      an amount the device is moved, relative to the rotation point, and
      the rotation angle based, at least partially, upon the amount of movement of the device.

20. The non-transitory computer readable medium of claim 13, further comprising computer executable instructions that, in response to execution by the computer, cause the computer to perform or cause to be performed:
   detect, via the tracking system, a movement of a user that corresponds to an interaction with the three-dimensional representation; and
   modify the content in response to the interaction.

21. A mirror array display to generate a three-dimensional representation of content, the mirror array display comprising:
   a mirror array that includes a plurality of mirrors;
   a tracking system configured to generate tracking data;
   a light source configured to emit light for projection by the plurality of mirrors; and
   a controller configured to:
      determine at least one aiming parameter for at least one of the plurality of mirrors, wherein the at least one aiming parameter is based at least in part on the tracking data, wherein the determination of the at least one aiming parameter comprises execution of, based at least partially upon a convergence point, an aiming algorithm, wherein the execution of the aiming algorithm comprises determination of a viewer's position relative to the convergence point, and wherein the viewer's position facilitates projection of the three-dimensional representation of the content;

based at least in part on the tracking data, determine a modulation rate of light emitted by the light source;

control the light source to emit light in accordance with the modulation rate; and control an orientation of the at least one of the plurality of mirrors to project the light towards the convergence point, wherein the controller is configured to control the orientation of the at least one of the plurality of mirrors in accordance with the at least one aiming parameter.

22. The mirror array display of claim 21, further comprising a secondary mirror configured to direct light emitted by the light source towards the at least one of the plurality of mirrors, wherein the controller is further configured to control an orientation of the secondary mirror, and wherein the light source comprises a laser.

23. The mirror array display of claim 22, wherein the controller is further configured to:

determine, using the tracking data, a location, relative to the mirror array display, of a viewing area associated with the viewer; and determine the convergence point based, at least partially, upon the location of the viewing area.

24. The mirror array display of claim 23, wherein the controller is further configured to:

determine that the viewer has moved relative to the convergence point;

after the determination that the viewer has moved, determine at least one modified aiming parameter and a modified convergence point; and aim the light emitted by the light source to the modified convergence point, wherein the light is aimed to the modified convergence point in accordance with the at least one modified aiming parameter.

25. The mirror array display of claim 23, wherein the controller is further configured to:

determine that the viewing area has moved relative to the convergence point; and after the determination that the viewing area has moved:

determine a rotation angle, relative to a rotation axis associated with the mirror array display, of a movement of the viewing area, modify the content in accordance with the rotation angle to obtain modified content, determine a modified convergence point, in accordance with the rotation angle, and aim the light emitted by the light source to the modified convergence point.

26. The mirror array display of claim 21, wherein the mirror array has a first side and a second side, and wherein the light source is located at the first side and the convergence point is located at the second side.

27. The mirror array display of claim 21, wherein the mirror array has a first side and a second side, and wherein the light source and the convergence point are located at the first side of the mirror array.

28. The mirror array display of claim 21, wherein the controller is further configured to:

detect, via the tracking system, a movement of a user that corresponds to an interaction with the three-dimensional representation; and modify the content in response to the interaction.

* * * * *

UNITED STATES PATENT AND TRADEMARK OFFICE
CERTIFICATE OF CORRECTION

PATENT NO. : 9,851,574 B2  
APPLICATION NO. : 14/232797  
DATED : December 26, 2017  
INVENTOR(S) : Bromer Page 1 of 1

It is certified that error appears in the above-identified patent and that said Letters Patent is hereby corrected as shown below:

Column 26, Line 9, delete "shutting a first" and insert -- shutting a fist --, therefor.

Signed and Sealed this  
Twenty-fourth Day of April, 2018

Andrei Iancu  
*Director of the United States Patent and Trademark Office*